(12) United States Patent
Kikuchi

(10) Patent No.: US 7,659,532 B2
(45) Date of Patent: Feb. 9, 2010

(54) IMAGE READING APPARATUS CAPABLE OF READING INFRARED AND VISIBLE IMAGES

(75) Inventor: Michio Kikuchi, Kanagawa (JP)

(73) Assignee: Fuji Xerox Co., Ltd., Tokyo (JP)

( * ) Notice: Subject to any disclaimer, the term of this patent is extended or adjusted under 35 U.S.C. 154(b) by 0 days.

(21) Appl. No.: 12/222,088

(22) Filed: Aug. 1, 2008

(65) Prior Publication Data

US 2008/0304703 A1    Dec. 11, 2008

Related U.S. Application Data

(62) Division of application No. 11/481,107, filed on Jul. 6, 2006, now Pat. No. 7,432,492.

(30) Foreign Application Priority Data

Mar. 3, 2006    (JP)    ............... P2006-058688

(51) Int. Cl.
*G03G 15/00* (2006.01)
*G01N 21/86* (2006.01)
*H01L 27/00* (2006.01)
(52) U.S. Cl. .......... 250/566; 250/205; 250/559.44; 250/234; 250/339.05; 355/37; 355/70; 358/509; 358/513
(58) Field of Classification Search ............ 250/208.1, 250/205, 559.05–559.08, 559.4, 559.44, 250/234, 566, 568, 338.1, 339.01, 339.02, 250/339.05; 358/500, 505, 509, 510, 513, 358/514, 515; 355/18, 35, 37, 53, 67, 68, 355/70
See application file for complete search history.

(56) References Cited

U.S. PATENT DOCUMENTS

| 5,416,308 | A | 5/1995 | Hood et al. |
| 5,969,372 | A | 10/1999 | Stavely et al. |
| 6,084,692 | A | 7/2000 | Ohtani et al. |
| 6,111,669 | A | 8/2000 | Nordstrom |
| 6,552,778 | B1 | 4/2003 | Konagaya |
| 6,924,911 | B1 | 8/2005 | Ford et al. |

(Continued)

FOREIGN PATENT DOCUMENTS

JP    62-48862    3/1987

(Continued)

*Primary Examiner*—John R Lee
(74) *Attorney, Agent, or Firm*—Morgan, Lewis & Bockius LLP

(57) ABSTRACT

An image reading apparatus includes a light source with a first luminescent portion that outputs light with a first wavelength range and a second luminescent portion that outputs light with a second wavelength range, the wavelength ranges being different from each other; a light-receiving portion that receives light reflected from an original irradiated by the light source; a scanning portion that shifts a reading position of the original in a vertical scanning direction by changing a relative position between the original and the light-receiving portion; a switching portion that alternately turns on the first and second luminescent portions when the scanning portion shifts the reading position, wherein a vertical scanning resolution for a first data obtained when the first luminescent portion is turned on is independently set from a vertical scanning resolution for a second data obtained when the second luminescent portion is turned on.

7 Claims, 26 Drawing Sheets

U.S. PATENT DOCUMENTS

| | | |
|---|---|---|
| 7,023,587 B2 | 4/2006 | Ikeda |
| 7,432,492 B2 * | 10/2008 | Kikuchi .................... 250/208.1 |
| 2006/0180673 A1 * | 8/2006 | Finnerty et al. ............. 235/491 |
| 2007/0205355 A1 * | 9/2007 | Kikuchi .................... 250/208.1 |
| 2008/0304703 A1 * | 12/2008 | Kikuchi ...................... 382/100 |

FOREIGN PATENT DOCUMENTS

| | | |
|---|---|---|
| JP | 62-188951 | 8/1987 |
| JP | 62-188952 | 8/1987 |
| JP | 2-151985 | 6/1990 |
| JP | 3-180384 | 8/1991 |
| JP | 4-83464 | 3/1992 |
| JP | 4-87453 | 3/1992 |
| JP | 6-141135 | 5/1994 |
| JP | 7-154595 | 6/1995 |
| JP | 8-98019 | 4/1996 |
| JP | 10-65135 | 3/1998 |
| JP | 2001-169096 | 6/2001 |
| JP | 2002-209059 | 7/2002 |
| JP | 2003-60842 | 2/2003 |
| JP | 2003-222956 | 8/2003 |
| JP | 2003-228140 | 8/2003 |
| JP | 2005-210268 | 8/2005 |

* cited by examiner

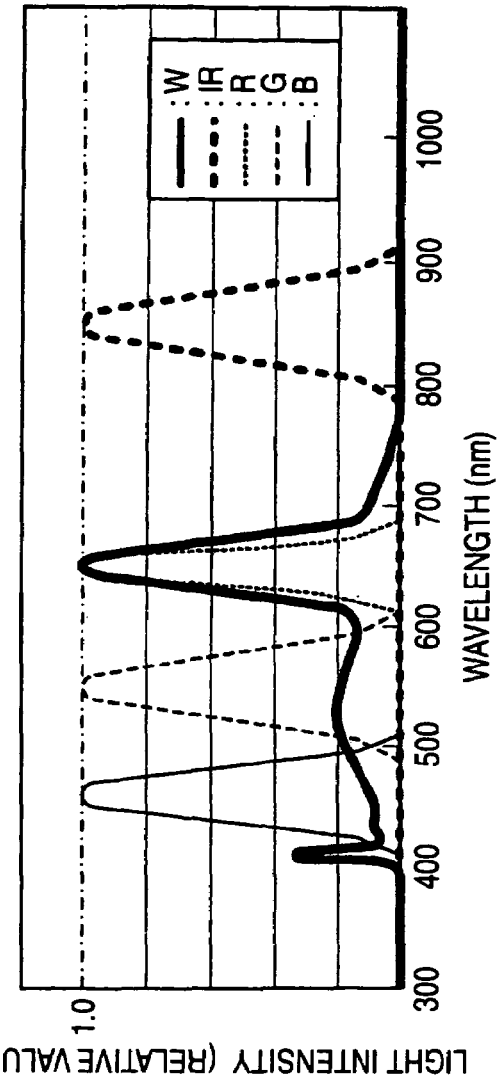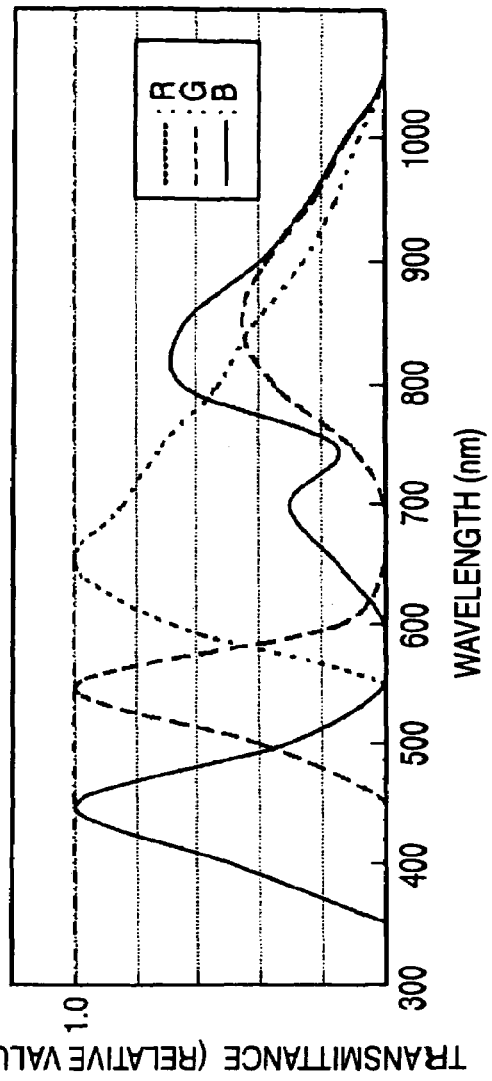
FIG. 4A
FIG. 4B

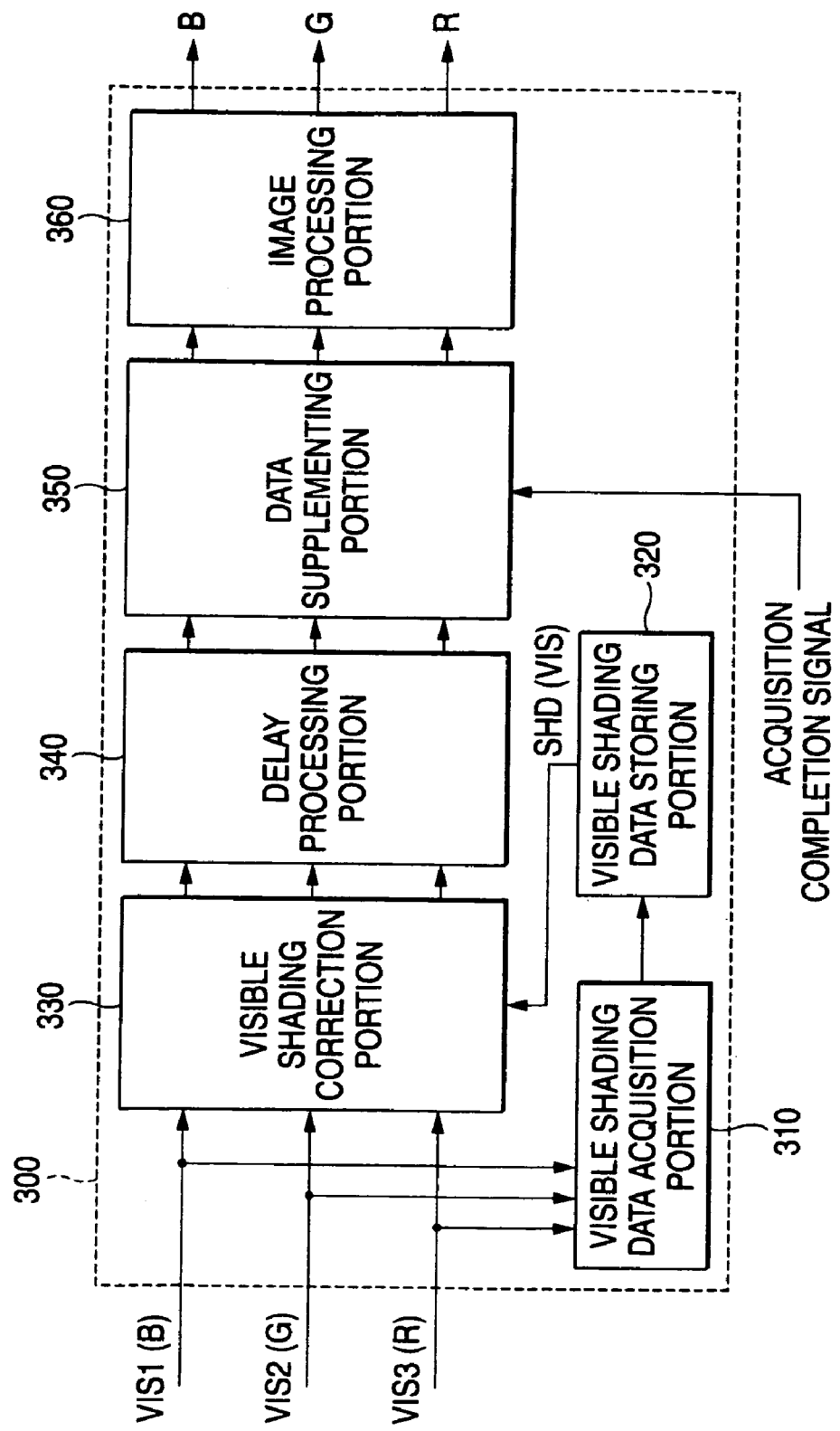

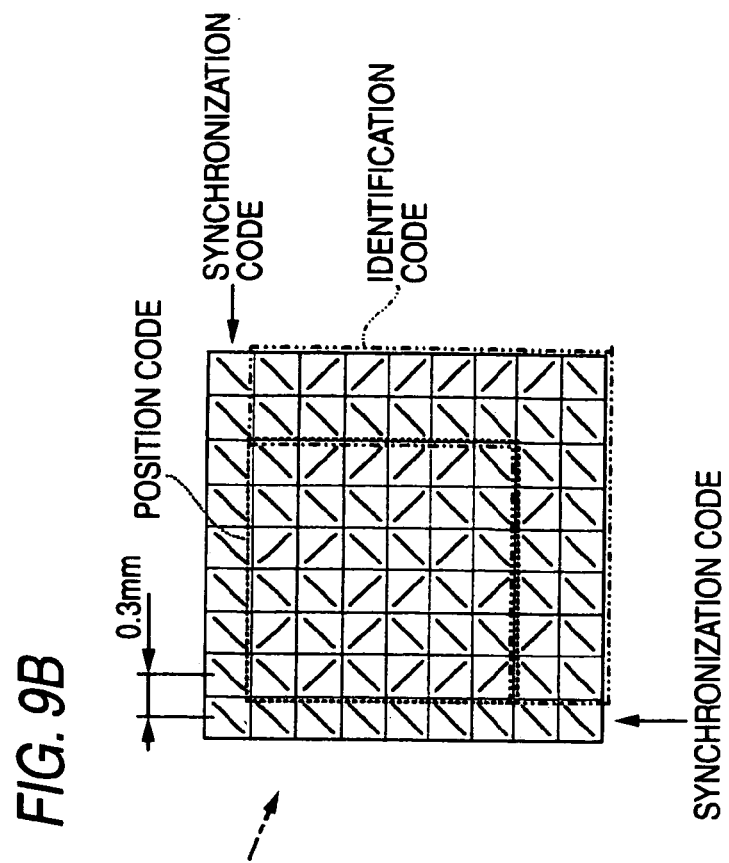
FIG. 9A
FIG. 9B
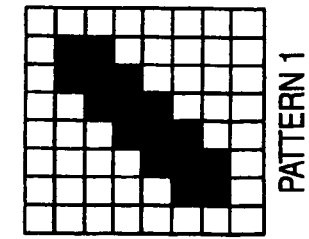
PATTERN 1
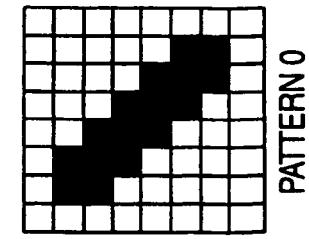
PATTERN 0
FIG. 9C

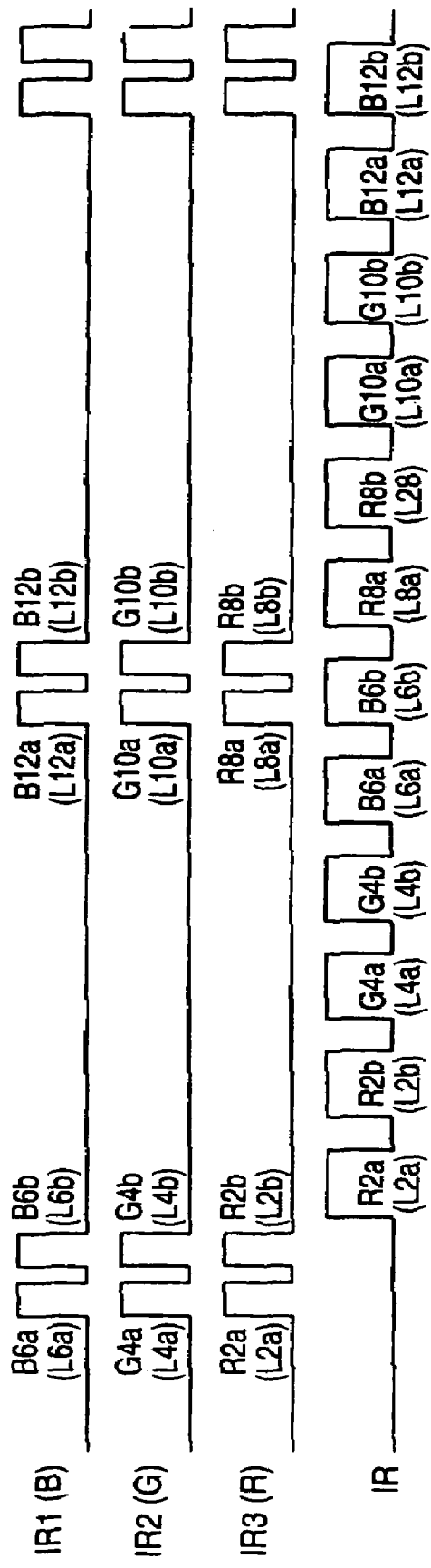

IMAGE READING APPARATUS CAPABLE OF READING INFRARED AND VISIBLE IMAGES

This application is a Divisional of Copending U.S. patent application Ser. No. 11/481,107, filed Jul. 6, 2006 now U.S. Pat. No. 7,432,492 and claims the benefit of Japanese Patent Application No. 2006-058688, filed Mar. 3, 2006, both of which are hereby incorporated in their entirety.

BACKGROUND OF THE INVENTION

The present invention relates to an image reading apparatus for reading images on an original.

FIELD OF THE INVENTION

Reading devices such as a copy machine or a fax machine, or image reading devices such as a scanner for automatically reading image data from an original to input the data into a computer are widely used. In this kind of image reading devices, the light is irradiated onto the original from a light source, and the reflection light reflected from the original is received by an image sensor to read the image on the original. Recently, an image reading device capable of reading color images as well as monochrome images has been widely popularized. The image reading device for reading color images usually adopts a light source capable of emitting red, green, and blue (RGB) lights and an image sensor in which multiple pixel lines corresponding to each color are arranged in a vertical scanning direction. In addition, a color filter having a red, green, or blue color is provided in each pixel line (e.g., an on-chip filter).

However, the color filter installed in each pixel line often has a property of transmitting the light having a wavelength range other than that of a corresponding color, for example, a near infrared (IR) light. In this case, each pixel line is sensitive to the IR light as well as the red, green, and blue lights. As a result, the data read by each pixel line includes an IR light component as well as a desired color light component.

For this reason, a technique for inserting a reading filter for cutting out unnecessary wavelength lights such as an infrared light in the middle of an optical path for guiding the reflection light from the original to each pixel line has been proposed.

In addition, recently, due to increasing concern about security or electronization, a technique for forming an invisible image that cannot be recognized by human eyes on a special original, for example using an image forming medium (such as ink or toner) that absorbs or reflects the IR rays, is being adopted in order to distinguish the special original such as a note or a valuable paper from a typical original. In addition to the special original, for example, a technique for additionally forming an invisible image containing code information (such as an identification code) using the image forming medium on an original that has visible confidential information has been considered.

Therefore, it is necessary to provide an image reading apparatus capable of reading an infrared image in addition to a visible image.

SUMMARY OF THE INVENTION

According to an aspect of the invention, there is provided an image reading apparatus comprising: a light source that has a first luminescent portion for outputting a light with a first wavelength range and a second luminescent portion for outputting a light with a second wavelength range, the second wavelength range being different from the first wavelength range; a light-receiving portion that receives a reflection light reflected from an original irradiated by the light source; a scanning portion that shifts a reading position of the original read by the light-receiving portion in a vertical scanning direction, by changing a relative position between the original and the light-receiving portion; a switching portion that alternately turns on the first and second luminescent portions when the scanning portion shifts the reading position, wherein a vertical scanning resolution for a first data obtained from the light-receiving portion when the switching portion turns on the first luminescent portion is independently set from a vertical scanning resolution for a second data obtained from the light-receiving portion when the switching portion turns on the second luminescent portion.

BRIEF DESCRIPTION OF DRAWINGS

Exemplary embodiments of the present invention will be described in detail based on the following figures, wherein:

FIGS. 4A and 4B are diagrams illustrating wavelength-luminescence characteristics of a white LED and an infrared LED, and wavelength-transmittance characteristic of a color filter provided in each of red, green, and blue pixel lines, respectively;

FIG. 8 is a block diagram illustrating an exemplary construction of a visible post-processing portion;

FIGS. 9A, 9B, and 9C are diagrams for describing a two-dimensional code image included in an invisible image;

FIG. 26 is a timing chart for describing operations of a rearranging portion in a first reading mode.

DETAILED DESCRIPTION OF THE PREFERRED EMBODIMENTS

Hereinafter, a best mode for implementing the present invention (hereinafter, referred to as an exemplary embodiment) will be described with reference to the accompanying drawings.

First Exemplary Embodiment

Figure 1:
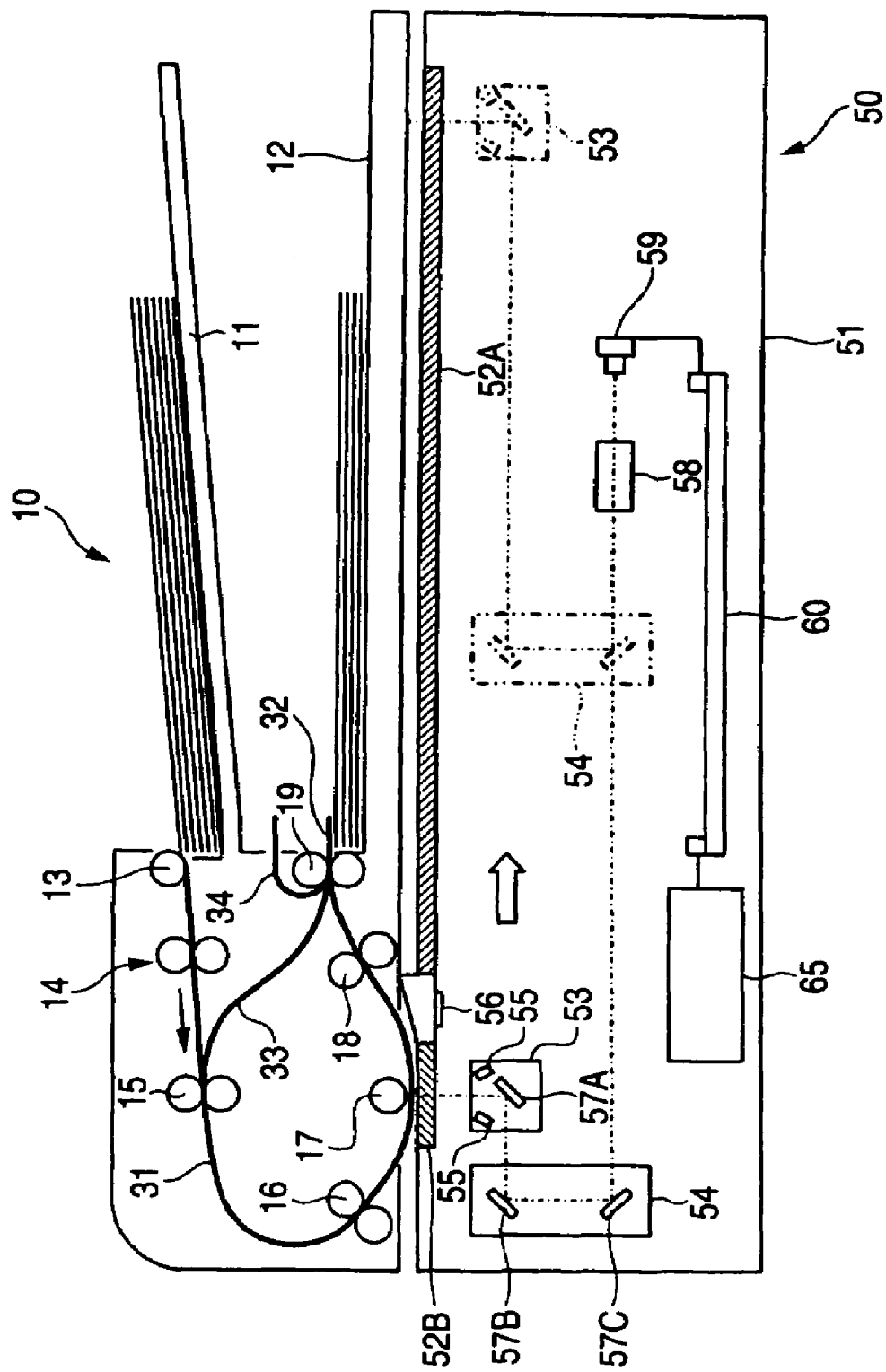
FIG. 1 is a diagram illustrating an exemplary construction of an image reading apparatus according an exemplary embodiment of the present invention.

FIG. 1 is a diagram illustrating an exemplary image reading apparatus according to a first exemplary embodiment of the present invention. This image reading apparatus is designed to allow an image on a movable original as well as an image on a fixed original to be read. In addition, the image reading apparatus includes an original conveyer 10 for sequentially conveying the originals from multiple originals that have been loaded and a reader 50 for reading an image through a scanning.

The original conveyer 10 comprises an original tray 11 for loading multiple originals and a discharge tray 12 provided under the original tray 11 to receive the originals that have been read. The original conveyer 10 has a nudger roller 13 for pulling out the original from the original tray 11 and delivering it. In addition, a handling mechanism 14 for handling each piece of papers using a feed roller and a retard roller is provided in a downstream side from the nudger roller 13 along the original conveyance direction. In a first conveyance path 31 for conveying the original, a pre-resist roller 15, a resist roller 16, a platen roller 17, and an out roller 18 are provided in this order from an upstream side along an original conveyance direction. The pre-resist roller 15 conveys each processed original towards the rollers disposed in a downstream side and performs a loop formation of the original. The resist roller 16 halts its rotation once and restarts to rotate in synchronization with the timing to supply the original while performing a registration adjustment for the original reading portion, which will be described below. The platen roller 17 assists the conveyance of the original which is being read by the reader 50. The out roller 18 conveys the original that has been read by the reader 50 further downstream.

In addition, a second conveyance path 32 for guiding the original to the discharge tray 12 is provided in a downstream side from the out roller 18 along the original conveyance direction. The second conveyance path 32 is provided with a discharge roller 19.

Furthermore, in this image reading apparatus, a third conveyance path 33 is provided between an outlet of the out roller 18 and an inlet of the pre-resist roller 15. This allows the images formed on both sides of the original to be read in one process. Also, the discharge roller 19 has a function of making a reverse turn and conveying the original to the third conveyance path 33.

Still furthermore, in this image reading apparatus, a fourth conveyance path 34 is provided to make a reverse turn again and discharge the original to the discharge tray 12 when a double-side reading is performed. The fourth conveyance path 34 is disposed in an upper side of the second conveyance path 32. Also, the aforementioned discharge roller 19 has a function of making a reverse turn and conveying the original to the fourth conveyance path 34.

On the other hand, the reader 50 supports the original conveyer 10 to allow it to be opened/closed and also supports the original conveyer 10 by using its device frame 51. The reader 50 also reads the images on the original conveyed by the original conveyer 10. The reader 50 includes a device frame 51 for forming a casing, a first platen glass 52A for disposing the original to be read in a halted condition, and a second platen glass 52B having an optical opening for reading the original conveyed by the original conveyer 10.

In addition, the reader 50 includes a full-rate carriage 53 that either stops under the second platen glass 52B or moves along the entire surface of the first platen glass 52A to scan the image, and a half-rate carriage 54 for supplying the light obtained from the full-rate carriage 53 to an imaging unit. The full-rate carriage 53 includes an LED light source 55 for irradiating the original and a first mirror 57A for receiving the reflection light from the original. In addition, the half-rate carriage 54 includes second and third mirrors 57B and 57C for providing the light obtained from the first mirror 57A to the imaging unit. Furthermore, the reader 50 includes an imaging lens 58 and a CCD (charge coupled device) image sensor 59. The imaging lens 58 optically reduces the optical image obtained from the third mirror 57C. The CCD image sensor 59 opto-electrically converts the optical image formed using the imaging lens 58. In other words, the reader 50 forms an image on the CCD image sensor 59 by using a form of reduction optics.

60 performs a predetermined processing for the original image data input from the CCD In addition, a white reference board 56 extended along a horizontal scanning direction is provided under a member provided between the first and second platen glasses 52A and 52B.

The reader 50 further includes a controller/image processor 60. The controller/image processor image sensor 59. In addition, the controller/image processor 60 controls operations of each portion in a read operation of the entire image reading apparatus including the original conveyer 10 and the reader 50.

Now, a fundamental read operation of the original using this image reading apparatus will be described with reference to FIG. 1. As described above, the image reading apparatus can perform a read operation for the original fixed on the first platen glass 52A (i.e., in an original-fixed reading mode) as well as a read operation for the original conveyed by the original conveyer 10 (i.e., in an original-movable reading mode).

First of all, an original-fixed reading mode will be described.

When an image of the original fixed on the first platen glass 52A is read, the full-rate carriage 53 and the half-rate carriage 54 are shifted along a scanning direction (an arrow direction in the drawing) in a ratio of 2:1. In this case, the light from the LED light source 55 of the full-rate carriage 53 is irradiated onto a target surface of the original. Then, the reflection light from the original is reflected on the first, second, and third mirrors 57A, 57B, and 57C in this order so as to be guided to the imaging lens 58. The light guided to the imaging lens 58 forms an image on a light-receiving surface of the CCD image sensor 59. As will be described below, the CCD image sensor 59 is a one-dimensional sensor, and simultaneously processes one line of an image. Then, the full-rate and half-rate carriages 53 and 54 are moved along this line (i.e., along a vertical scanning direction) to read the next line of the original. This operation is repetitively performed for the entire surface of the original to complete a read operation for one page of the original. In an original-fixed reading mode, the full-rate and half-rate carriages 53 and 54 function as a scanning portion or a moving portion.

Subsequently, an original-movable reading mode will be described.

When an image of the original conveyed by the original conveyer 10 is to be read, the conveyed original passes through an upper side of the second platen glass 52B. In this case, the full-rate and half-rate carriages 53 and 54 are arranged in a position shown as a solid line in FIG. 1 in a stop condition. Then, the reflection light corresponding to a first line of the original that has passed through the platen roller 17 of the original conveyer 10 is guided to the imaging lens 58 via the first, second, and third mirrors 57A, 57B, and 57C to form an image, and the formed image is read by the CCD image sensor 59. The CCD image sensor 59 simultaneously processes one horizontal scanning line, and then, the next horizontal scanning line of the original conveyed by the original conveyer 10 is read. In addition, a read operation for one page of the original along a vertical scanning direction is completed when a bottom end of the original passes through a reading position of the second platen glass 52B after a top end of the original reaches a reading position of the second platen glass 52B. In the original-movable reading mode, the original conveyer 10 functions as a scanning portion or a moving portion.

When images formed on both sides of the original are read, a driving direction of the discharge roller 19 is reversed just before a bottom end of the original that has been read for one surface passes through the discharge roller 19 provided in the second conveyance path 32. In this case, the original is guided to the third conveyance path 33 by switching a direction of a gate (not shown in the drawing). It should be noted that the bottom end of the original is changed to the top end at this time. In addition, after front and rear surfaces of the original are turned over, the original passes through an upper surface of the second platen glass 52B, so that the rear surface of the original is read similarly to the aforementioned process for the front surface. Subsequently, a driving direction of the discharge roller 19 is reversed again just before the bottom end of the original that has been read for the rear surface passes through the discharge roller 19 provided in the second conveyance path 32. In this case, the original is guided to the fourth conveyance path 34 by switching a direction of a gate (not shown in the drawings). It should be noted that, unlike the original that has been disposed initially on the original tray 11, the front and rear surfaces are turned over, while its top and bottom ends are reversed again when the original is discharged to the discharge tray 12. As a result, multiple originals can be filed up in the same order between when they have been stored in the original tray 11 and when they are discharged to the discharge tray 12.

Now, each portion of the image reading apparatus will be described in more detail.

Figure 2:
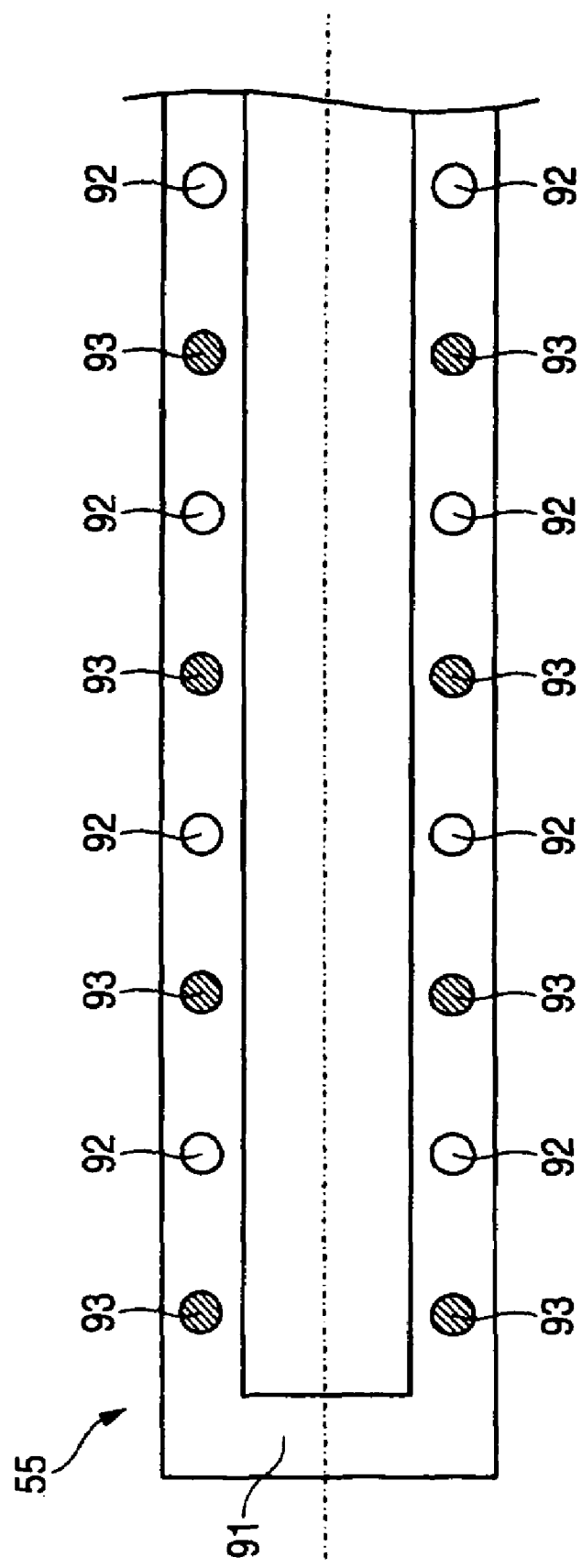
FIG. 2 is a diagram illustrating an exemplary construction of an LED light source.

FIG. 2 is a diagram illustrating a construction of an LED light source 55 as an example of a light source provided in the reader 50. The LED light source 55 irradiates the original from both sides of the first mirror 57A as shown in FIG. 1. The LED light source 55 includes a rectangular base portion 91 having an opening in its center, multiple white LEDs 92, and multiple infrared LEDs 93. The white LEDs 92 and the infrared LEDs 93 are alternately arranged along a longitudinal direction, i.e., a horizontal scanning direction of the original. As will be described below, the white LEDs 92 emit a white light containing red (R), green (G), and blue (B) colors. In addition, the infrared LEDs 93 emit an infrared light containing IR rays.

Figure 3:
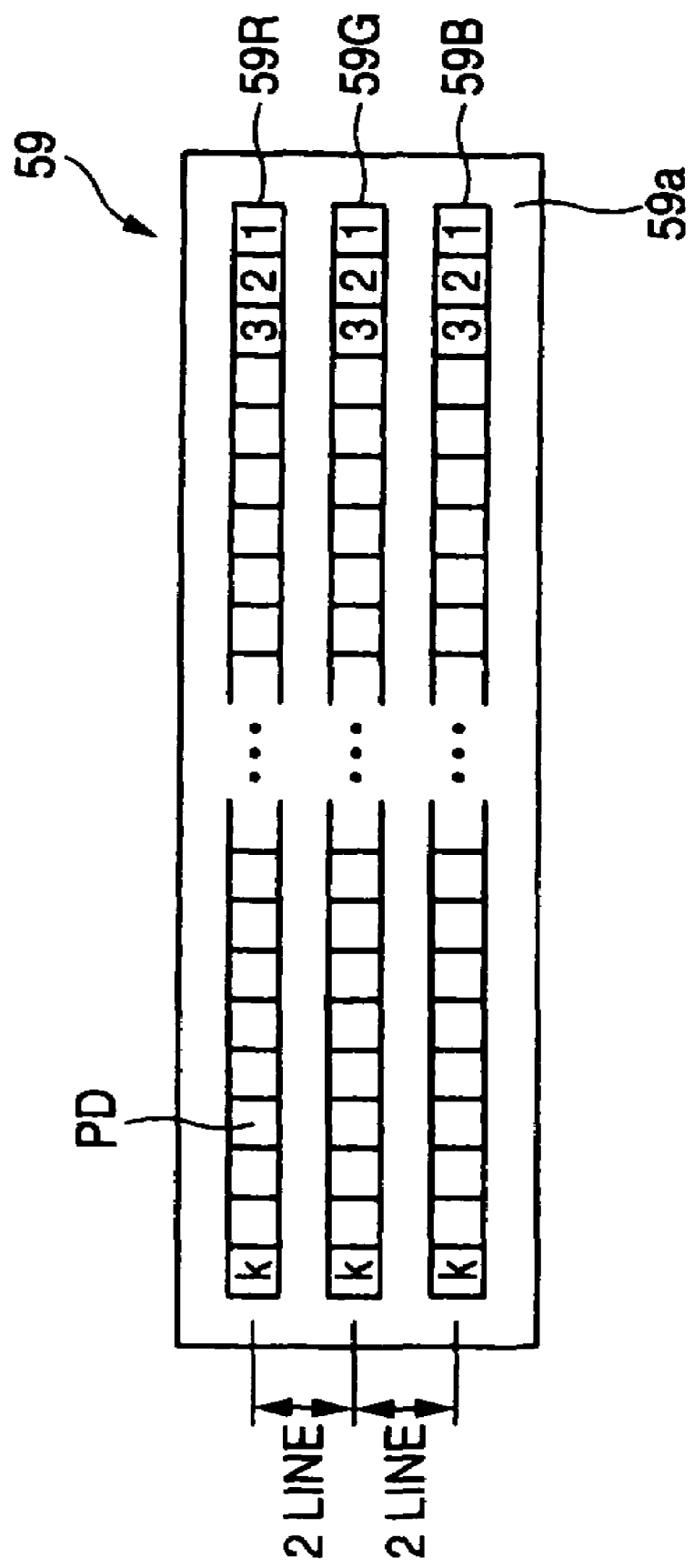
FIG. 3 is a diagram illustrating a schematic construction of a CCD image sensor.

FIG. 3 is a diagram illustrating a schematic construction of a CCD image sensor 59 as a light-receiving portion provided in the reader 50. The CCD image sensor 59 includes a rectangular sensor board 59a and three pixel lines (i.e., multiple pixel lines) 59R, 59G, and 59B arranged on the sensor board 59a. Hereinafter, the three pixel lines 59R, 59G, and 59B are referred to as a red pixel line 59R, a green pixel line 59G, and a blue pixel line 59B, respectively. The red, green, and blue pixel lines 59R, 59G, and 59B are arranged in parallel along a direction orthogonal to the original conveyance direction. The red, green, and blue pixel lines 59R, 59G, and 59B may be constructed, for example, by arranging a number k of photodiodes PD having an area of $10\,\mu m \times 10\,\mu m$ in a straight line, respectively. It should be noted that, according to the present exemplary embodiment, the reading resolutions in a horizontal scanning direction (hereinafter, referred to as a horizontal scanning resolution) for the red, green, and blue pixel lines 59R, 59G, and 59B are set to, for example, 600 spi (samples per inch). In addition, an interval between the blue and green pixel lines 59B and 59G and an interval between the green pixel line 59G and the red pixel line 59R are set to 2 lines in a vertical scanning direction, respectively.

The red, green, and blue pixel lines 59R, 59G, and 59B are provided with a color filter for transmitting other wavelength components, respectively, so that each of the red, green, and blue pixel lines 59R, 59G, and 59B functions as a color sensor. Additionally, each color filter provided in each of the red, green, and blue pixel lines 59R, 59G, and 59B is designed to transmit an IR light having a predetermined wavelength range in addition to a respective visible light. For this reason, the red, green, and blue pixel lines 59R, 59G, and 59B also function as an IR pixel line, respectively.

FIG. 4A is a diagram illustrating wavelength-luminescence characteristics of a white LED 92 as a first luminescent portion and an infrared LED 93 as a second luminescent portion. The white LED 92 includes a bluish-purple light-emitting diode having a blue wavelength range (e.g., 405 nm) and red, green, and blue fluorescent materials, and emits a light across a continuous wavelength range from a blue range (in the vicinity of 400 nm) through a green range (in the vicinity of 550 nm) to a red range (in the vicinity of 800 nm). However, as shown in FIG. 4A, the white LED 92 emits almost no light within a near-infrared range (800-1,000 nm). On the other hand, the IR LED 93 includes an infrared light-emitting diode having an infrared wavelength range (in the vicinity of 850 nm). However, as shown in FIG. 4A, the IR LED 93 emits almost no light within a visible wavelength range (400-800 nm). Therefore, the white LED 92 emits a light having a visible range as a first wavelength range, and the IR LED 93 emits a light having an infrared range as a second wavelength range.

It should be noted that, although a white LED 92 having the aforementioned construction is used in the present exemplary embodiment, the present invention is not limited thereto. FIG. 4A also shows a luminescent characteristic of a white LED 92 manufactured by combining the blue, green, and red LEDs. That is, a white light may be produced by combining the blue, green, and red LEDs. In this case, there should be no luminescent spectrum within a near-infrared range, or if any, its intensity should be negligible. When a white LED 92 has a luminescent spectrum in the vicinity of the near-infrared range and reversely worsens color image quality, it is necessary to provide a separate filter for cutting off infrared components near the white LED 92. In this case, the infrared cut-off filter should not be disposed in the optical path of the IR LED 93.

FIG. 4B shows a wavelength-transmittance characteristic of a color filter provided in the aforementioned red, green, and blue pixel lines 59R, 59G, and 59B. The color filter provided in the blue pixel line 59B transmits the light having a blue wavelength range but cuts off almost of the light having a green or red wavelength range. Similarly, the color filter provided in the green pixel line 59G transmits the light having a green wavelength range but cuts off almost of the light having a blue or red wavelength range. Similarly, the color filter provided in the red pixel line 59R transmits the light having a red wavelength range but cuts off almost of the light having a blue or green wavelength range. However, the color filters provided in the red, green, and blue pixel lines 59R, 59G, and 59B, respectively, have an appropriate transmittance for the light having a near-infrared wavelength range (in the vicinity of 850 nm).

Figure 5:
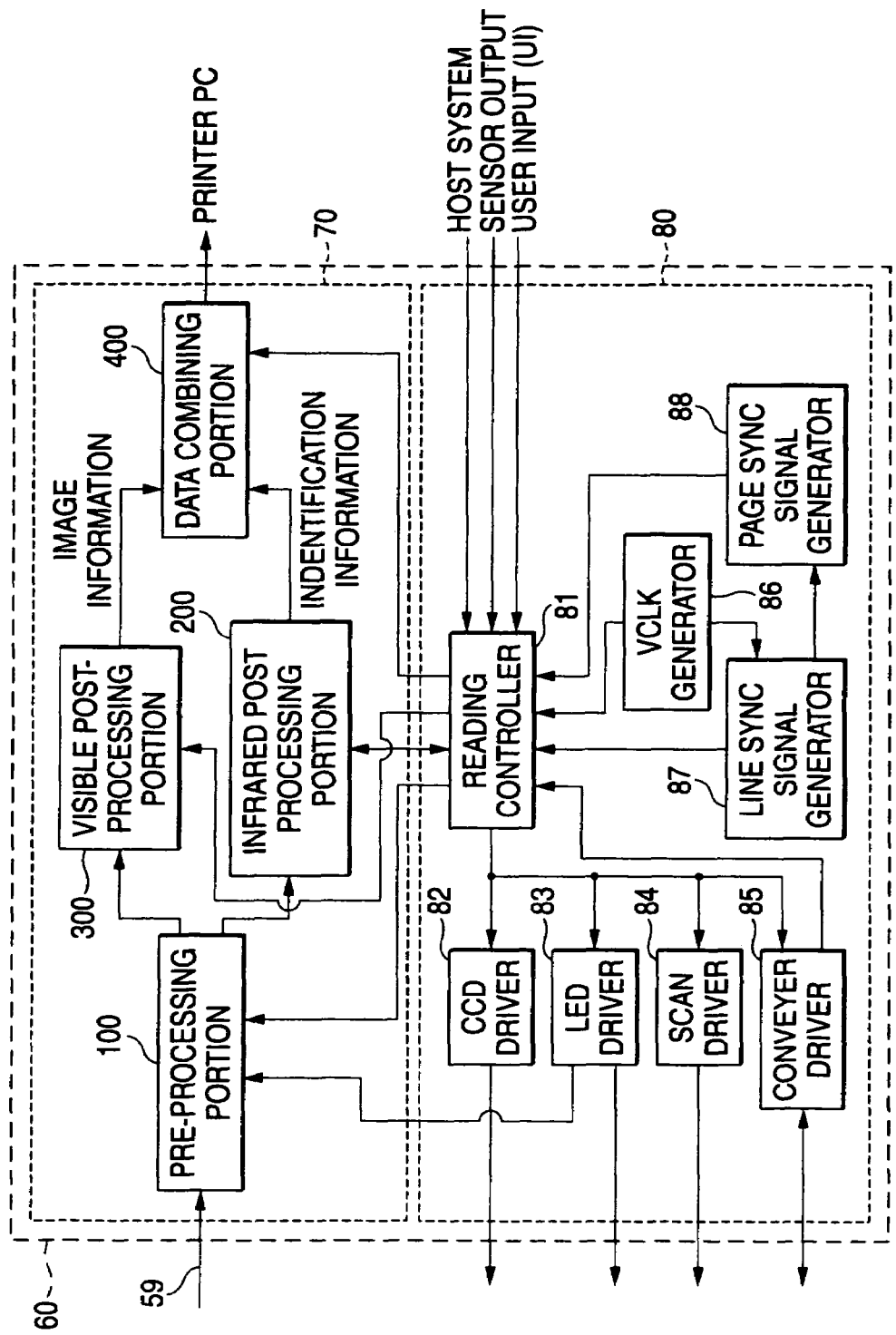
FIG. 5 is a block diagram illustrating a control/image-processing unit.

FIG. 5 is a block diagram illustrating a controller/image processor 60 of FIG. 1. The controller/image processor 60 includes a signal processing portion 70 and a control portion 80. The signal processing portion 70 processes the image data input from the CCD image sensor 59 (more specifically, from the blue, green, and red pixel lines 59B, 59G, and 59R). In addition, the controller 80 controls operations of the original conveyer 10 and the reader 50.

The signal processing portion 70 includes a pre-processing portion 100, an infrared post-processing portion 200, a visible post-processing portion 300, and a data combining portion 400.

The pre-processing portion 100 converts each of the (analog) image data input from the blue, green, and red pixel lines 59B, 59G, and 59R of the CCD image sensor 59 into digital data. In addition, the pre-processing portion 100 separates each of the converted digital image data into image data for an invisible image and image data for a visible image as will be described below and outputs them.

The infrared post-processing portion 200 functioning as a second acquisition portion, an identification information acquisition portion, or a second processing portion analyzes the input image data for the invisible image to extract and output the identification information included in the invisible image.

The visible post-processing portion 300 functioning as a first acquisition portion, an image information acquisition portion, or a first processing portion performs a predetermined image process for the input image data for the visible image and outputs the result as image information.

The data combining portion 400 combines the identification information input from the infrared post-processing portion 200 and the image data output from the visible post-processing portion 300 and outputs the result to a device (e.g., a printer or a personal computer (PC)) provided in a subsequent stage.

Meanwhile, the controller 80 includes a reading controller 81, a CCD driver 82, an LED driver 83, a scan driver 84, and a conveyer driver 85.

The reading controller 81 performs various kinds of controls for reading the original as well as controls for the entire image reading apparatus including the original conveyer 10 and the reader 50 shown in FIG. 1.

The CCD driver 82 controls an operation of receiving the image data through the CCD image sensor 59 (including the blue, green, and red pixel lines 59B, 59G, and 59R: refer to FIG. 3).

The LED driver 83 functioning as a switching portion outputs the LED on/off switching signal to control turning-on/off of the white LED 92 and the infrared LED 93 of the LED light-source 55 in synchronization with the reading timing for the original. The scan driver 84 turns on/off a motor in the reader 50 to control a scan operation of the full-rate and half-rate carriages 53 and 54.

The conveyer driver 85 controls tuning-on/off of a motor, various rollers, clutches, and a gate in the original conveyer 10.

Control signals are output from such various drivers to the original conveyer 10 and the reader 50, so that they can be controlled based on such control signals. The reading controller 81 presets a reading mode based on, for example, a control signal from a host system, a sensor output detected in an automatic selection reading function, selection of a user, and the like to control the original conveyer 10 and the reader 50. This reading mode may include an original-fixed reading mode for reading the original fixed on the first platen glass 52A and an original-movable reading mode for reading the original conveyed through the second platen glass 52B. In addition, the original-movable reading mode may include a single-side mode for reading an image on only a single side of the original, a double-side mode for reading images on both sides of the original, and the like.

In addition, the controller 80 additionally includes a video clock (VCLK) generator 86, a line synchronization signal generator 87, and a page synchronization signal generator 88.

The VCLK generator 86 generates a video clock serving as a reference signal for the image read operation. The VCLK clock is output to the line synchronization signal generator 87, the page synchronization signal generator 88, and the reading controller 81, respectively. This video clock period is set to a sufficiently low value in comparison with a line period, which will be described below.

The line synchronization generator 87 generates a line synchronization signal. The line synchronization signal is instantaneously asserted in every line period when the CCD image sensor 59 obtains image data for one line in a horizontal scanning direction of the original. In this exemplary embodiment, it is assumed that the line synchronization signal is asserted every time a count value for the video clocks input from the VCLK generator 86 is coincident with a predetermined value.

The page synchronization signal generator 88 generates a page synchronization signal. The page synchronization signal is asserted only for a reading period corresponding to one sheet of the original to be read. In the present exemplary embodiment, it is assumed that the page synchronization signal starts to be asserted when the top end of the original reaches a reading position for the CCD image sensor 59. The page synchronization signal is negated when a count value for the line synchronization signal counted from this time point is coincident with a predetermined setup value.

Figure 6:
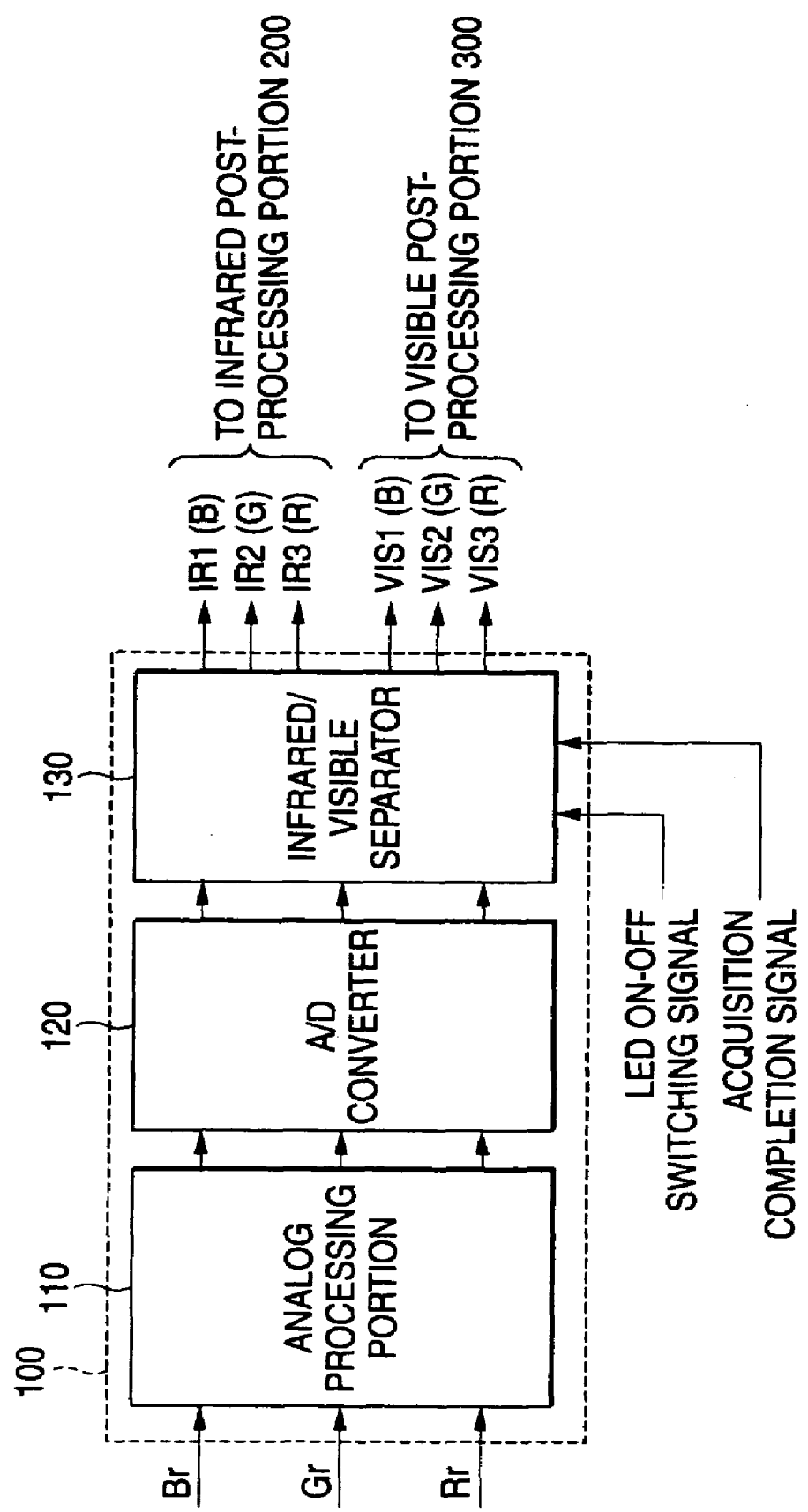
FIG. 6 is a block diagram illustrating an exemplary construction of a pre-processing portion.

FIG. 6 is a block diagram illustrating an exemplary construction of the aforementioned pre-processing portion 100. The pre-processing portion 100 includes an analog processing portion 110, an A/D converter 120, and an infrared/visible separator 130. The analog processing portion 110 independently receives first, second, and third data Br, Gr, and Rr input from the blue, red, and green pixel lines 59B, 59G, and 59R, respectively, of the CCD image sensor 59. In addition, the first, second, and third data Br, Gr, and Rr input from the CCD image sensor 59 are analog data.

The analog processing portion 110 executes analog correction such as a gain and offset adjustment for the first, second, and third data Br, Gr, and Rr.

The A/D converter 120 converts the first, second, and third data Br, Gr, and Rr into digital data after the analog correction.

The infrared/visible separator 130 functioning as a separator separates the first, second, and third data Br, Gr, and Rr into the data obtained when the white LED 92 is turned on and the data obtained when the infrared LED 93 is turned on, and outputs them (refer to FIG. 2). An LED on/off switching signal is input from the LED driver 83 (refer to FIG. 5) to the infrared/visible separator 130, and the infrared/visible separator 130 performs an operation of separating and outputting the infrared and visible lights based on the LED turning-on/off signal. Specifically, the infrared/visible separator 130 separates the first data Br into the first infrared data IR1(B) and the first visible data VIS1(B). Similarly, the infrared/visible separator 130 separates the second data Gr into the second infrared data IR2(G) and the second visible data VIS2(G). Similarly, the infrared/visible separator 130 separates the third data Rr into the third infrared data IR3(R) and the third visible data VIS3(R). Then, the first, second, and third infrared data IR1(B), IR2(G), and IR3(R) are output to the infrared post-processing portion 200 as second data or multiple received data. On the other hand, the first, second, and third visible data VIS1(B), VIS2(G), and VIS3(R) are output to the visible post-processing portion 300 as first data.

The acquisition completion signal output is input from the identification information analyzer 250 (refer to FIG. 7, as will be described below) provided in the infrared post-processing portion 200 to the infrared/visible separator 130 when acquisition of the identification information is completed. In response to the acquisition completion signal, the infrared/visible separator 130 stops separating the first, second, and third data Br, Gr, and Rr, and outputs the first, second, and third data Br, Gr, and Rr as the first, second, and third visible data VIS1(B), VIS2(G), and VIS3(R), respectively, without any change.

Figure 7:
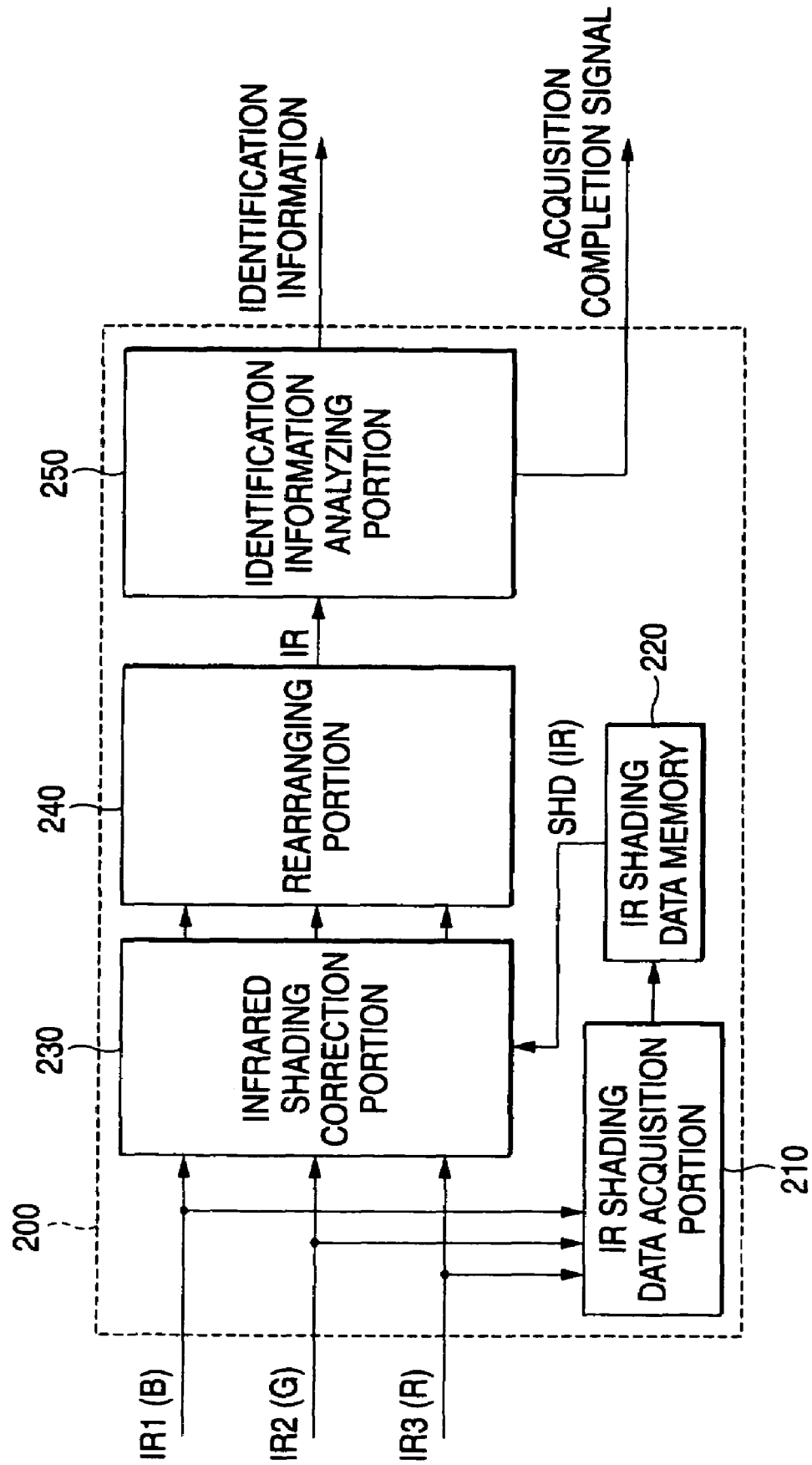
FIG. 7 is a block diagram illustrating an exemplary construction of an infrared post-processing portion.

FIG. 7 is a block diagram illustrating an exemplary construction of the aforementioned infrared post-processing portion 200. The infrared post-processing portion 200 includes an infrared shading data acquisition portion 210, an infrared shading data storing portion 220, an infrared shading correction portion 230, a rearranging portion 240, and an identification information analyzing portion 250. In addition, the first, second, and third infrared data IR1(B), IR2(G), and IR3(R) are independently input to the infrared post-processing portion 200 as described above.

The infrared shading data acquisition portion 210 acquires infrared shading data SHD(IR) that will be used in the shading correction for the infrared image data of the original. The infrared shading data SHD(IR) are set for the blue, green, and red pixel lines 59B, 59G, and 59R, respectively.

The infrared shading data storing portion 220 stores the infrared shading data SHD(IR) acquired from the infrared shading data acquisition portion 210.

The infrared shading correction portion 230 functioning as the second shading correction portion performs infrared shading correction for the input first, second, and third infrared data IR1(B), IR2(G), and IR3(R) by using each infrared shading data SHD(IR) read from the infrared shading data storing portion 220.

In the infrared shading correction, the input first, second, and third infrared data IR1(B), IR2(G), and IR3(R) are corrected based on variations of sensitivities of photodiodes PDs in each of the blue, green, and green pixel lines 59B, 59G, and 59R or the light intensity distribution characteristics in the LED light source 55 (in this case, the infrared LED 93).

The rearranging portion 240 rearranges the first, second, and third infrared data IR1(B), IR2(G), and IR3(R) input after the infrared shading correction is completed and outputs the infrared data IR as second image data (i.e. infrared image data), third image data, or a single piece of received data.

The identification information analyzing portion 250 analyzes the identification information from the code image included in the input infrared data IR and outputs the obtained identification information to the data combining portion 400 (FIG. 5). The identification information analyzing portion 250 outputs an acquisition completion signal, representing that the identification information has been acquired, to the infrared/visible separator 130 (FIG. 6) when the analysis of the identification information is completed.

FIG. 8 is a block diagram illustrating an exemplary construction of the aforementioned visible post-processing portion 300. The visible post-processing portion 300 includes a visible shading data acquisition portion 310, a visible shading data memory 320, and a visible shading data correction portion 330. Also, the visible post-processing portion 300 additionally includes a delay processing portion 340, a data supplementing portion 350, and an image processing portion 360.

The visible shading data acquisition portion 310 acquires visible shading data SHD(VIS) to be used in the shading correction of the visible image data of the original.

In addition, the visible shading data SHD(VIS) are set for each of the blue, green, and red pixel lines 59B, 59G, and 59R, similarly to the aforementioned infrared shading data SHD(IR).

The visible shading data memory 320 stores the visible shading data SHD(VIS) acquired from the visible shading data acquisition portion 310.

The visible shading correction portion 330 functioning as a first shading correction portion performs the shading correction for the first, second, and third visible data VIS1(B), VIS2(G), and VIS3(R) by using each shading data SHD(VIS) read from the visible shading data memory 320.

In the visible shading correction, the input first, second, and third visible data VIS1(B), VIS2(G), and VIS3(R) are corrected based on variations of sensitivities of photodiodes PD in each of the blue, green, and red pixel lines 59B, 59G, and 59R or the light intensity distribution characteristics in the LED light source 55 (in this case, the white LED 92).

The delay processing portion 340 corrects the gap generated by different installation locations among the blue, green, and red pixel lines 59B, 59G, and 59R (of FIG. 3). In other words, as shown in FIG. 3, there is an interval of 2 lines between the green pixel line 59G and the red pixel line 59R in a vertical scanning direction, and there is also an interval of 2 lines between the blue pixel line 59B and the green pixel line 59G in a vertical scanning direction. For this reason, when the original is read by the image reading apparatus according to the present exemplary embodiment, a particular area (in a horizontal scanning direction) in the original is firstly read by the blue pixel line 59B, read by the green pixel line 59G, and then, read by the red pixel line 59R. From a different viewpoint, each of the blue, green, and red pixel lines 59B, 59G, and 59R reads different areas of an image at the same timing since there is an interval of 2 lines in a vertical scanning direction between each line. Therefore, the delay processing portion 340 uses the third visible data VIS3(R) lastly read by the red pixel line 59R as a delay reference, and delays the second visible data VIS2(G) read by the green pixel line 59G by 2 lines in a vertical scanning direction with respect to the third visible data VIS3(R) and also the first visible data VIS1 (B) read by the blue pixel line 59B by 4 lines in a vertical scanning direction with respect to the third visible data VIS3 (R) (i.e., by 2 lines in a vertical scanning direction with respect to the second visible data VIS2(G)). As a result, the first, second, and third visible data VIS1(B), VIS2(G), and VIS3(R) obtained by reading the same area (corresponding to the same horizontal scanning line) of the original are synchronized and output from the delay processing portion 340.

The data supplementing portion 350 supplements the first, second, and third visible data VIS1(B), VIS2(G), and VIS3 (R) to fill the data omitted by the separation in the infrared/visible separator 130 (refer to FIG. 6). In addition, the omitted data corresponds to the data output when the infrared LED 93 (refer to FIG. 2) is turned on, i.e., including the first, second, and third infrared data IR1(B), IR2(G), and IR3(R).

Furthermore, an acquisition completion signal is input to the data supplementing portion 350 from the identification information analyzing portion 250 (refer to FIG. 7) provided in the infrared post-processing portion 200. In response to the acquisition completion signal, the data supplementing portion 350 stops supplementing the aforementioned data, and outputs the first, second, and third visible data VIS1(B), VIS2 (G), and VIS3(R) without any change.

The image processing portion 360 performs various kinds of image processing for the first, second, and third visible data VIS1(B), VIS2(G), and VIS3(R), and outputs the blue, green, and red image data B, G, and R as image information or first image data (i.e., visible image data) to the data combining portion 400 (refer to FIG. 5). Processes performed in the image processing portion 360 may include, for example, Y/gray balance adjustment, color space conversion, enlargement/reduction, filtering, contrast adjustment, background elimination, and the like.

Now, an image of the original to be read by this image reading apparatus will be described in detail. The image reading apparatus may read an original having a visible image and an invisible image formed from a code image including the aforementioned identification information as well as an original having only a typical visible image formed from common colors such as yellow, magenta, cyan, and black. It should be noted that classification between "visible" and "invisible" does not depend on whether or not they can be recognized by human eyes. In other words, classification between "visible" and "invisible" depends on whether or not the image formed on a paper medium can be recognized based on chromogenicity caused by light absorption of a particular wavelength in a visible wavelength range.

FIGS. 9A, 9B, and 9C are diagrams for describing a two-dimensional code image included in the invisible image. FIG. 9A illustrates a lattice structure for schematically showing a unit of a two-dimensional code image formed from an invisible image. In addition, FIG. 9B is a diagram illustrating a unit of a two-dimensional code image, and FIG. 9C is a diagram for describing a slanted-line pattern including slashes "/" and backslashes "\".

The two-dimensional images shown in FIGS. 9A, 9B, and 9C are formed from an invisible image capable of safely performing a machine read operation by infrared light irradiation and a decoding process for a long time period, and also capable of recording information with a high density. In addition, it is preferable that the invisible image can be provided on an arbitrary area regardless of the area where the visible image is formed on a surface of a medium for outputting an image. In the present exemplary embodiment, the invisible image is formed on the entire surface of a medium (i.e., a paper) according to the size of a medium to be printed. In addition, it is more preferable to provide an invisible image capable of being recognized by human eyes with a difference in glossiness. However, the "entire surface" should not be considered to include all of four corners of a paper. In electrophotographic devices such as a laser printer, since there are many unprintable areas on edges of a paper, it is unnecessary to print the invisible image on such areas. Furthermore, it is assumed in the present embodiment that the two-dimensional code image is formed of a material having an absorption peak in the vicinity of a wavelength of 850 nm.

The two-dimensional code pattern shown in FIG. 9B includes an area for storing a position code representing a coordinate position on a medium and an area for storing an identification code for identifying an electronic document or a printing medium. Also, the two-dimensional code pattern includes an area for storing a synchronization code. In addition, as shown in FIG. 9A, multiple two-dimensional code patterns are arranged in a lattice structure in which other kinds of position information are stored on the entire surface of one page of a medium (i.e., a paper) according to the printing size of the medium. Specifically, as shown in FIG. 9B, multiple two-dimensional code patterns are arranged on one surface of a medium, and each includes a position code, an identification code, and a synchronization code. In addition, different kinds of position information are stored in each of the position code areas depending on where they are arranged. On the other hand, the same identification information is stored in multiple identification code areas regardless of where they are arranged.

In FIG. 9B, the position code is disposed within a rectangular area of 6 bits×6 bits. Each bit may be formed with multiple minute line bitmaps having different rotation angles, and a bit value of 0 or 1 is represented by the slanted-line pattern (including a pattern of 0 or 1) as shown in FIG. 9C. More specifically, a bit value of 0 or 1 is represented by a slash "/" or a backslash "\" having a different slanted angle. The slanted-line pattern is constructed in a pixel size of 8×8 with a resolution of 600 dpi (dot per inch). The backslash pattern (e.g., a pattern of 0) designates a bit value of 0, and the slash pattern (e.g., a pattern of 1) designates a bit value of 1. Therefore, one slanted-line pattern can be used to express one bit (0 or 1). By using the aforementioned minute line bitmap having two kinds of slanted angles, it is possible to provide a two-dimensional code pattern having little noise on the visible image and capable of digitizing and embedding an amount of information in a high density.

In other words, position information including a total of 36 bits is stored in the position code area shown in FIG. 9B. Among 36 bits, 18 bits may be used in an X-coordinates encoding, and the remaining 18 bits may be used in a Y-coordinate encoding. If each of 18 bits is used for encoding all positions, $2^{18}$ (i.e., about 260,000) positions can be encoded.

As shown in FIG. 9C, when each slanted-line pattern has a pixel size of 8×8 (600 dpi), the size of one dot is 0.0423 mm in 600 dpi. Therefore, both horizontal and vertical lengths of the two-dimensional code (including a synchronization code) shown in FIG. 9(b) become about 3 mm (=8 pixels×9 bits× 0.0423 mm). When 260,000 positions are encoded with an interval of 3 mm, a length of 786 m can be encoded. All of 18 bits may be used in the encoding as described above, or a part of them may include a redundancy check bit for error detection or error correction when it is suspected that errors in detecting the slanted-line patterns can occur.

The identification code is arranged in a rectangular area of 2 bits×8 bits or 6 bits×2 bits and may store identification information of a total of 28 bits. When all of 28 bits are used for the identification information, $2^{28}$ pieces (about 270,000,000) of identification information can be expressed. Similarly, a part of the identification code of 28 bits may include a redundancy check bit for error detection or error correction.

In addition, although the slanted-line pattern has two elements having an angle difference of 90° in the example shown in FIG. 9C, the slanted-line pattern may be constructed to have four elements if the angle difference is set to 45°. In this case, one slanted-line pattern can be used to express 2 bit information (0-3). That is, the number of available bits can be increased by increasing the kinds of the angles between elements of the slanted-line pattern.

In addition, although bits are encoded by using the slanted-line pattern in the example shown in FIG. 9C, a selectable pattern is not limited to the slanted-line pattern. For example, other encoding methods such as a dot On/Off pattern or a deviated direction of a dot position with respect to a reference position can be used.

Figure 10:
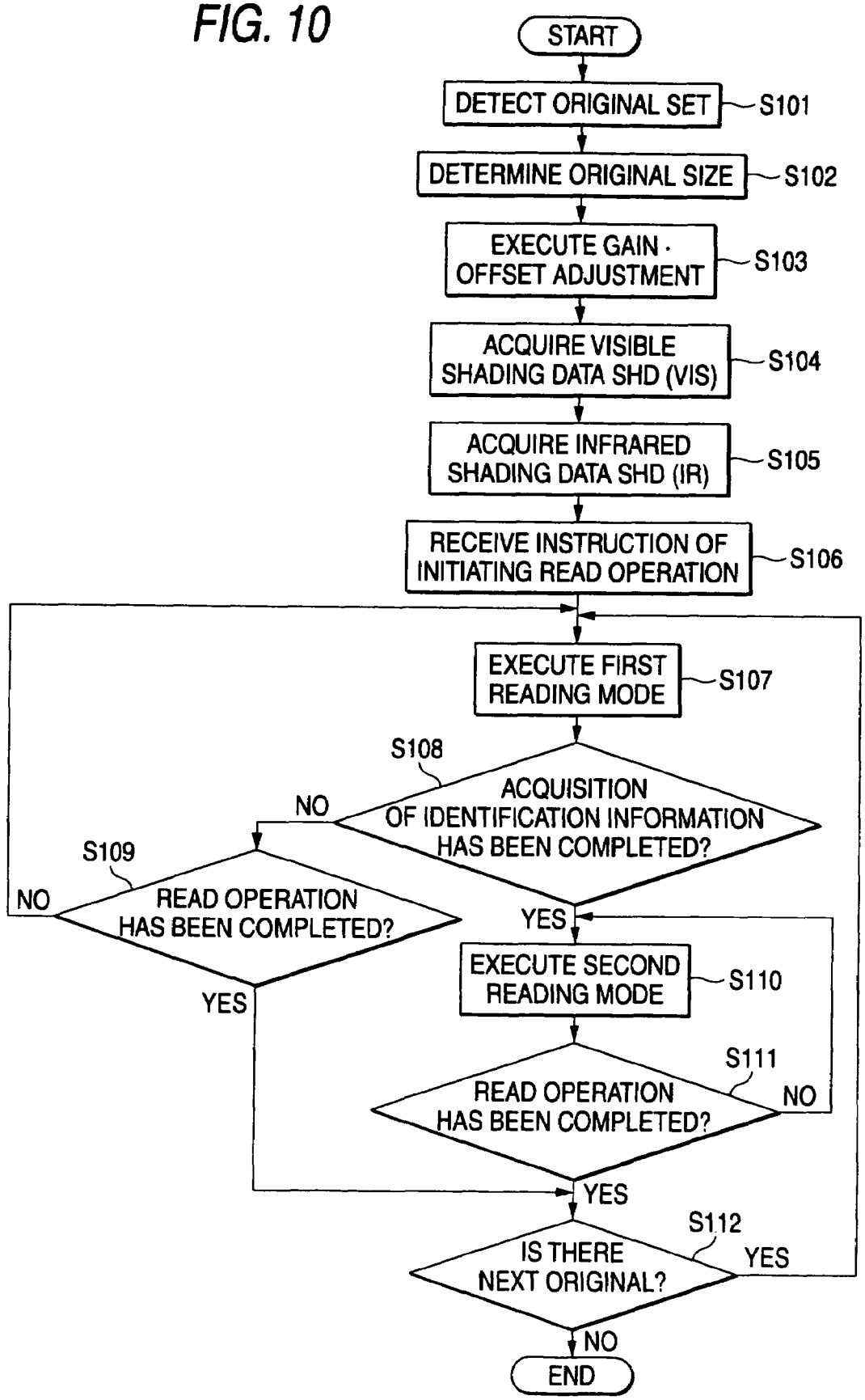
FIG. 10 is a flowchart for describing operations in an original-movable reading mode.

Now, operation flows in the image reading apparatus will be described in more detail by exemplifying the aforementioned original-movable reading mode. FIG. 10 is a flowchart for describing operations in the image reading apparatus in an original-movable reading mode.

When a set of originals in the original tray 11 are detected by a sensor (step 101), the reading controller 81 determines the size of the original based on the detection result of the sensor (step 102).

Then, the reading controller 81 outputs control signals to each driver in the controller 80 or each processing portion in the signal processing portion 70. Subsequently, gain and offset adjustment is executed (step 103), and the visible shading data SHD(VIS) (step 104) and the infrared shading data SHD (IR) (step 105) are acquired.

Then, a read start instruction is received from user's input of a host system or a user interface (step 106). Accordingly, the reading controller 81 outputs control signals to each driver in the controller 80 or each processing portion in the signal processing portion 70 to read an image of the original in a first reading mode (step 107). For example, the first reading mode is to alternately read the visible and invisible images on the original as will be described below. While the original is read in the first reading mode, the code information in the invisible image that has been read is analyzed in the identification information analyzing portion 250 of the infrared post-processing portion 200, and the identification information is acquired from the code information. Then, the reading controller 81 determines whether or not the acquisition of the identification information in the identification information analyzing portion 250 has been completed (step 108). Specifically, the reading controller 81 determines whether or not the acquisition completion signal has been input from the identification information analyzing portion 250. If it is determined that the acquisition of the identification information is not completed, the reading controller 81 determines whether or not a reading for one sheet of the original has been completed (step 109). If it is determined that the reading for one sheet of the original is not completed, the process returns to the step 107, and resumes the reading in the first reading mode. Otherwise, if it is determined that the reading for one sheet of the original is completed, the process advances to the step 112, which will be described below.

On the other hand, in the step 108, if it is determined that the acquisition of the identification information is completed, the reading controller 81 outputs control signals to each driver of the controller 80 or each processing portion in the signal processing portion 70, and executes the reading of the original image in a second reading mode (step 110). The second reading mode is to read only visible images on the original as will be described below. Then, the reading controller 81 determines whether or not the reading for one sheet of the original has been completed (step 111). If it is determined that the reading for one sheet of the original is not completed, the process returns to the step 110 to resume the reading in the second reading mode. Otherwise, if it is determined that the reading for one sheet of the original is completed, the process advances to the step 112.

In the aforementioned step 109 or 111, if it is determined that the reading for one sheet of the original is completed, the reading controller 81 determines whether or not there is a next original to be subsequently read (step 112). If it is determined that there is a next original, the process returns to the step 107 to execute the same processes for the next original. Otherwise, if it is determined that there is no next original, a set of processes are terminated.

Now, the steps 103-105 will be described in detail.

The reading controller 81 outputs a control signal to the scan driver 84 in response to detecting a set of originals in the original tray 11 by a sensor. In response to this control signal, the scan driver 84 shifts the full-rate carriage 53 to a position just under the white reference board 56 shown in FIG. 1, and shifts the half-rate carriage 54 to a corresponding position.

Then, the reading controller 81 outputs a control signal to the LED driver 83 in response to shifting the full-rate and half-rate carriages 53 and 54 to predetermined positions. In response to this control signal, the LED driver 83 outputs an LED on/off switching signal for turning on only the white LED 92, and as a result, the white LED 92 is turned on. In addition, the reading controller 81 simultaneously outputs a control signal to the CCD driver 82 when the turning-on of the LED is controlled. In response to this control signal, the CCD driver 82 executes the read operation of the CCD image sensor 59 (including the blue, green, and red pixel lines 59B, 59G, and 59R). In this case, the blue, green, and red pixel lines 59B, 59G, and 59R receive the reflection light from the white reference board 56 irradiated by the white LED 92. Then, each of the read data (the first data) from the blue, green, and red pixel lines 59B, 59G, and 59R is transmitted to the analog processing portion 110 of the pre-processing portion 100, and an A/D conversion is performed. A coefficient 1 used in the D/A conversion in the subsequent stage is calculated so that the data having a highest reflection can be a predetermined target value, and stored in a memory (not shown in the drawing) provided in the analog processing portion 110. Hereinbefore, calculation of a gain has been described.

Then, the reading controller 81 outputs a control signal to the LED driver 83. In response to this control signal, the LED driver 83 turns off the white LED 92. In this situation, both of the white LED 92 and the infrared LED 93 are turned off. In addition, the reading controller 81 outputs a control signal to the CCD driver 82. In response to this control signal, the CCD driver 82 executes a read operation in the CCD image sensor 59 (including the blue, green, and red pixel lines 59B, 59G, and 59R). Each read data (second data) from the blue, green, and red pixel lines 59B, 59G, and 59R is transmitted to the analog processing portion 110 of the pre-processing portion 100, and an A/D conversion is performed. Then, a coefficient 2 used in a D/A conversion in the subsequent stage is calculated such that an average of the read data can be a predetermined target value, and stored in a memory (not shown in the drawings) provided in the analog processing portion 110.

Through the aforementioned processes, the step 103 is completed. In addition, the reason for not using the infrared LED 93 for the gain adjustment in the step 103 is that it is preferable to design such that the CCD output generated when the white LED 92, which finally deals with multi-value data, is higher than that generated when the infrared LED 93 is turned on.

In response to completing the gain and offset adjustment, the reading controller 81 outputs a control signal to the LED driver 83, and turns on the white LED 92 again. Subsequently, the reading controller 81 outputs a control signal to the CCD driver 82. In response to this control signal, the CCD driver 82 executes a read operation in the CCD image sensor 59 (including the blue, green, and red pixel lines 59B, 59G, and 59R) with the white LED 92 being turned on. In this case, the blue, green, and red pixel lines 59B, 59G, and 59R receive a reflection light (a visible light) from the white reference board 56 irradiated by the white LED 92.

Each of the read data from the blue, green, and red pixel lines 59B, 59G, and 59R is input to the visible shading data acquisition portion 310 of the visible post-processing portion 300 after processes in the pre-processing portion 100 are performed. The visible shading data acquisition portion 310 acquires corresponding visible shading data SHD(VIS) from the read data obtained from the blue, green, and red pixel lines 59B, 59G, and 59R, and the acquired visible shading data SHD(VIS) are stored in the visible shading data memory 320. Through the aforementioned processes, the step 104 is terminated In response to completing the acquisition of the visible shading data SHD(VIS), the reading controller 81 outputs a control signal to the LED driver 83. In response to this control signal, the LED driver 83 outputs an LED on/off switching signal for turning on only the infrared LED 93 to the LED light source 55, and as a result, the infrared LED 93 is turned on. At the same time, the reading controller 81 outputs a control signal to the CCD driver 82. In response to this control signal, the CCD driver 82 executes a read operation in the CCD image sensor (including the blue, green, and red pixel lines 59B, 59G, and 59R) with the infrared LED 93 being turned on. In this case, the blue, green, and red pixel lines 59B, 59G, and 59R receive a reflection light (an infrared light) from the white reference board 56 irradiated by the infrared LED 93.

Each of the read data from the blue, green, and red pixel lines 59B, 59G, and 59R is input to the infrared shading data acquisition portion 210 of the infrared post-processing portion 200 after processes in the pre-processing portion 100 is executed. The infrared shading data acquisition portion 210 acquires corresponding infrared shading data SHD(IR) from each of the read data obtained from the blue, green, and red pixel lines 59B, 59G, and 59R, and stores the acquired infrared shading data SHD(IR) in the infrared shading data memory 220. Through the aforementioned processes, the step 105 is completed.

Now, the first reading mode in the step 107 and the second reading mode in the step 110 will be described in detail. In addition, before the first and second reading modes are described, various conditions or settings that should be set forth before the read operation for the original is initiated will be described.

Figure 11:
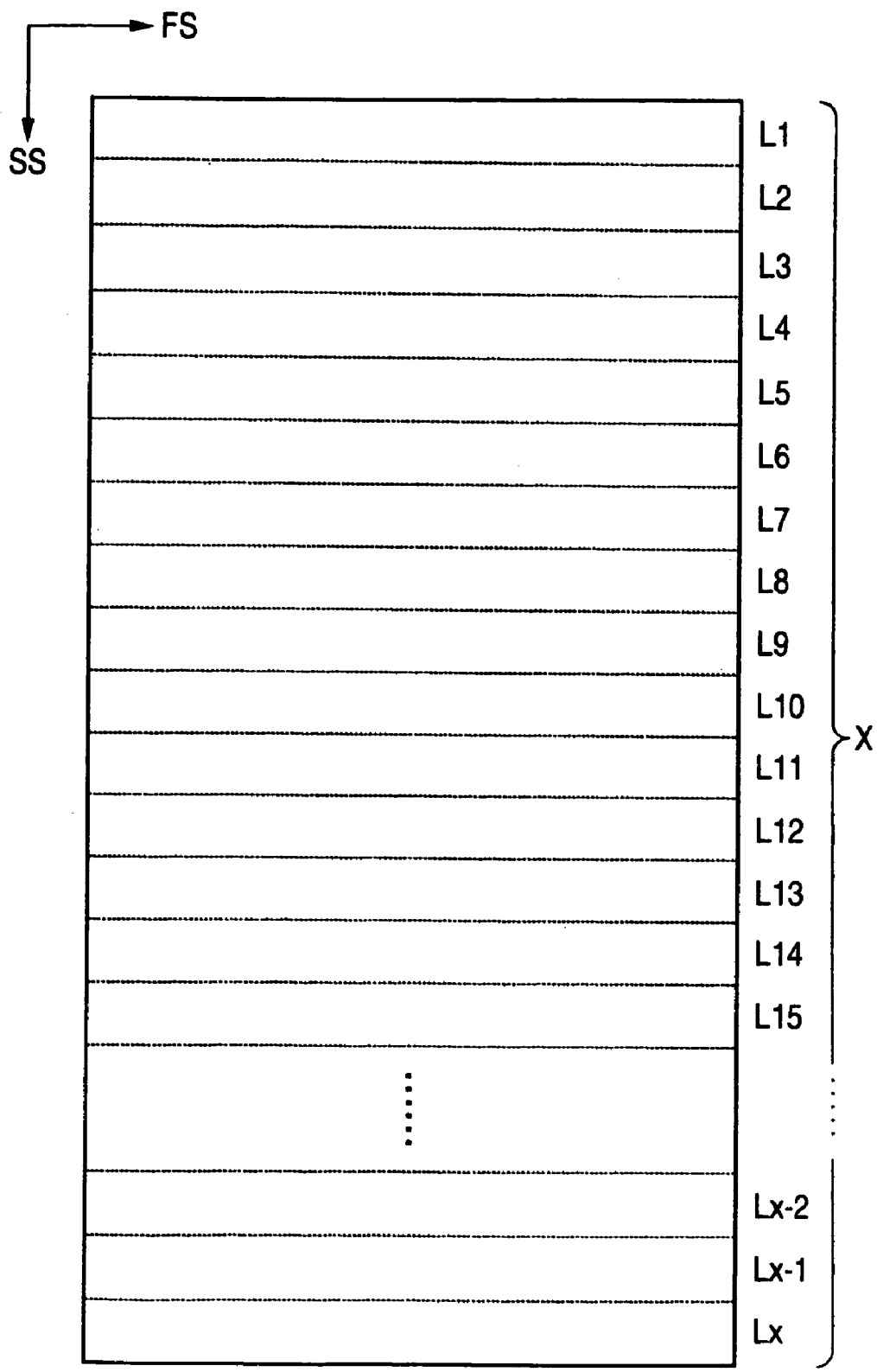
FIG. 11 is a diagram for describing the number of read lines required to read an image for one page of an original.

FIG. 11 is a diagram for describing the number X (where, X is an integer not less than 1) of the read lines required to read one page of the original. In this image reading apparatus, one line of the image on the original is read in a horizontal scanning direction FS by using the CCD image sensor 59 (refer to FIG. 1) as described above. Then, the CCD image sensor 59 and the original are relatively shifted with respect to each other in a vertical scanning direction SS to read the next line of the image on the original in a horizontal scanning direction FS. It should be noted that in the original-fixed reading mode, the relative position between the CCD image sensor 59 and the original changes by moving the full-rate and half-rate carriages 53 and 54. On the contrary, in the original-movable reading mode, the relative position between the CCD image sensor 59 and the original changes by moving the original.

In addition, the number X of the read lines is determined based on the length of the original in a vertical scanning direction and a required reading resolution in a vertical scanning direction (hereinafter, a vertical scanning resolution). For example, assuming that the original having a size of A4SEF (Short Edge Feed) is read in a vertical scanning resolution of 600 spi, the required number X of read lines is about 7,000.

Figure 12:
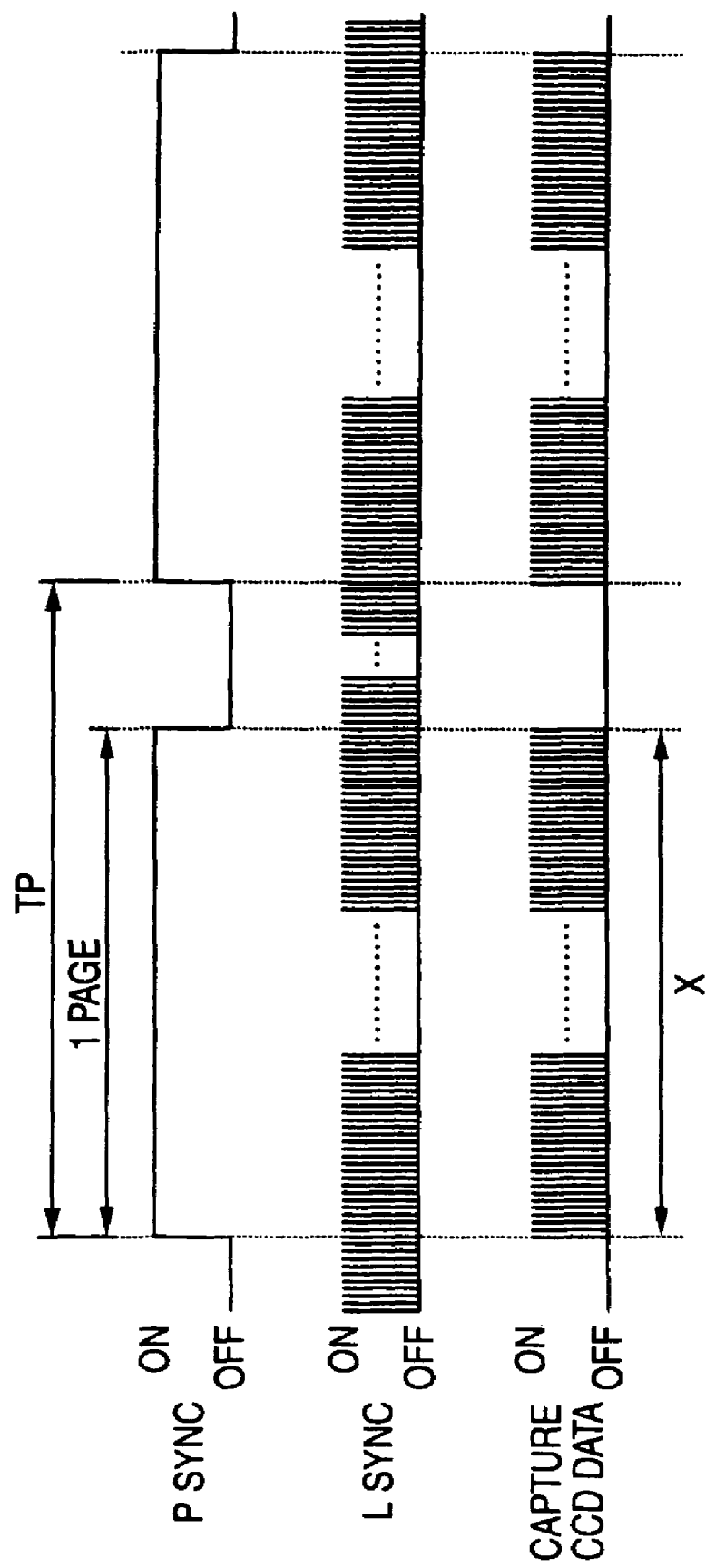
FIG. 12 is a timing chart illustrating a relationship between turning-on of the LED light source and an output from the CCD image sensor in a first reading mode.

FIG. 12 is a timing chart illustrating relationships among the page synchronization signal Psync output from the synchronization signal generator 88 shown in FIG. 5, the line synchronization signal Lsync output from the line synchronization signal generator 87, and the CCD capture signal CCD SH output from the CCD driver 82 through the reading controller 81.

The page synchronization signal generator 88 asserts the page synchronization signal Psync for only the reading period corresponding to one page for one sheet of the original to be read, as described above. In addition, a period after the page synchronization signal Psync is asserted until when the next page synchronization signal Psync is asserted is called a page period TP.

In addition, the line synchronization signal generator 87 asserts the line synchronization signal Lsync for every period required to acquire image data corresponding to one line on the original in a horizontal scanning direction, as describe above.

In addition, the CCD driver 82 asserts the CCD capture signal CCD SH in such a way that the image data can be captured by the CCD image sensor 59 in synchronization with the line synchronization signal Lsync, while the page synchronization signal Psync is asserted. In addition, the number of asserting the CCD capture signal while the page synchronization signal Psync is asserted is identical to the aforementioned number X of read lines.

Now, the first reading mode in the step 107 will be described with reference to FIGS. 13 to 17.

Figure 13:
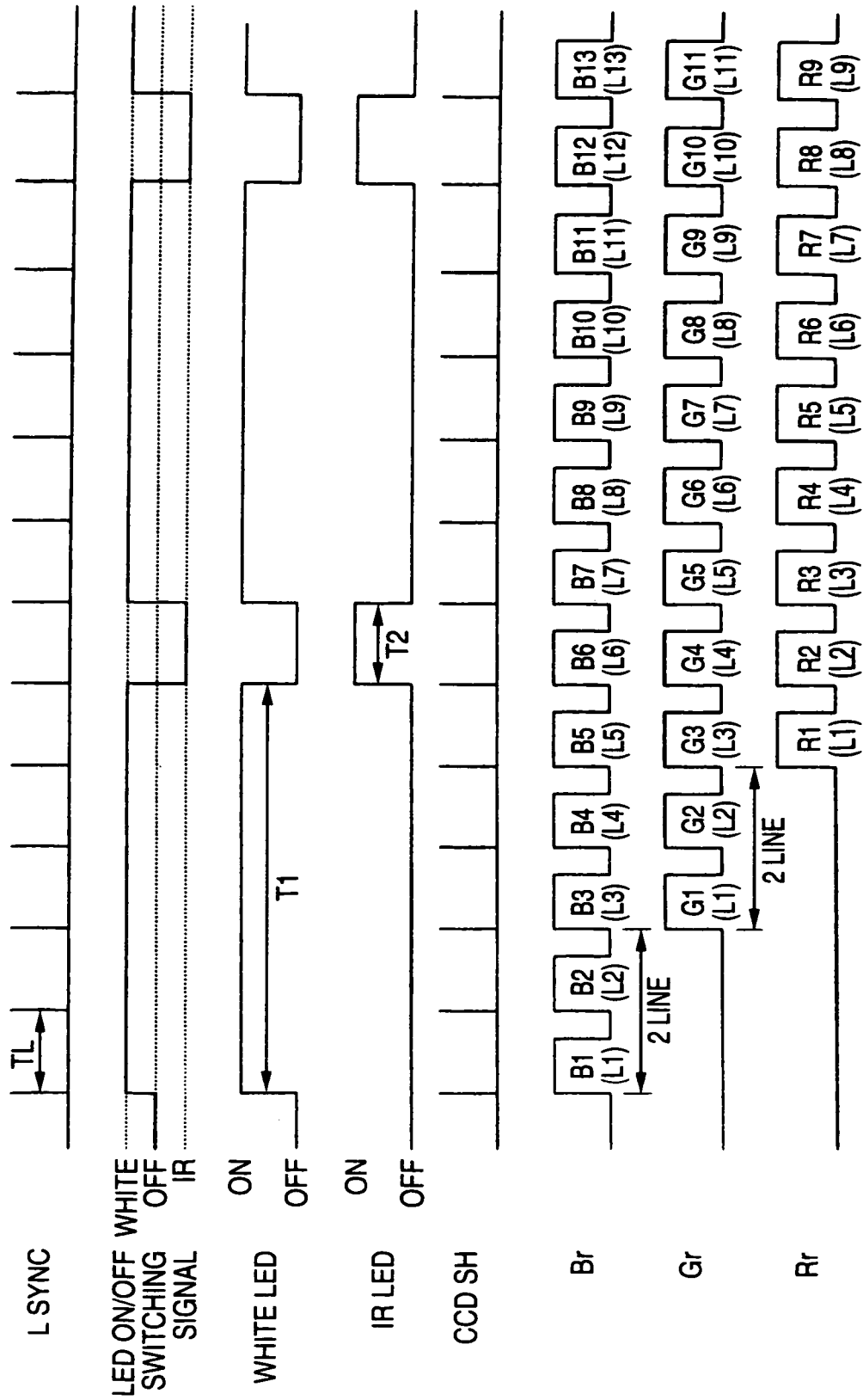
FIG. 13 is a timing chart illustrating relationships among a line synchronization signal, an LED on/off switching signal, turning-on/off of a white LED and an infrared LED, a CCD capture signal, and first, second, and third data in a first reading mode.

FIG. 13 is a timing chart illustrating relationships among the line synchronization signal Lsync, the LED on/off switching signal, turning-on/off of the white and infrared LEDs 92 and 93, the CCD capture signal CCD SH, and the first, second, and third data Br, Gr, and Rr in the first reading mode. Herein, a period after the line synchronization signal Lsync is asserted until the next line synchronization signal Lsync is asserted is called a line period TL.

When the first reading mode is initiated, the LED driver 83 outputs the LED on/off switching signal based on the line synchronization signal Lsync input through the reading controller 81. Specifically, the LED driver 83 counts the number of assertions the line synchronization signal Lsync, and outputs an LED on/off switching signal to the LED light source 55, so that only the white LED 92 is turned on for 5 lines corresponding to the first to fifth counts, and only the infrared LED 93 is turned on for the sixth line corresponding to the sixth count.

In response to the LED on/off switching signal, the LED light source 55 repeatedly performs a turning-on/off operation in such a way that only the white LED 92 is turned on for 5 line periods TL corresponding to 5 lines and only the infrared LED 93 is turned on for the next line period TL corresponding to 1 line.

On the other hand, the CCD driver 82 outputs the CCD capture signal CCD SH synchronized with the line synchronization signal Lsync to the CCD image sensor 59 (including the blue, green, and red pixel lines 59B, 59G, and 59R). In response to the CCD capture signal CCD SH, the blue, green, and red pixel lines 59B, 59G, and 59R sequentially output the read data corresponding to one line in a horizontal scanning direction as the first, second, and third data Br, Gr, and Rr, respectively.

It should be noted that the blue, green, and red pixel lines 59B, 59G, and 59R are spaced with an interval of 2 lines in a vertical scanning direction as shown in FIG. 3. For this reason, 2 lines are delayed after the capture of the first data Br is initiated in the blue pixel line 59B (i.e., after the first data Br(B1) corresponding to the first read line L1 on the original starts to be output) until the capture of the second data Gr is initiated in the green pixel line 59G (i.e., until the second data Gr(G1) corresponding to the first read line L1 on the original starts to be output). Similarly, 2 lines are delayed after the capture of the second data Gr is initiated in the green pixel line 59G (i.e., after the second data Gr(G1) corresponding to the first read line L1 on the original starts to be output) until the capture of the third data Rr is initiated in the red pixel line 59R (i.e., until the third data Rr(R1) corresponding to the first read line L1 on the original starts to be output).

Therefore, for example, when the blue pixel line 59B captures the first data Br(B6) corresponding to the sixth read line L6, the green pixel line 59G captures the second data Gr(G4) corresponding to the fourth read line L4 on the original, and the output from the red pixel line 59R relates to the third data Rr(R2) corresponding to the second read line L2 on the original.

Now, the process flow in the pre-processing portion 100 will be described.

The first, second, and third data Br, Gr, and Rr (analog signals) that have been acquired as described above are subjected to the gain and offset adjustment in the analog processing portion 110, and converted into digital signals in the A/D converter 120. The converted digital signals are input to the infrared/visible separator 130.

Figure 14:
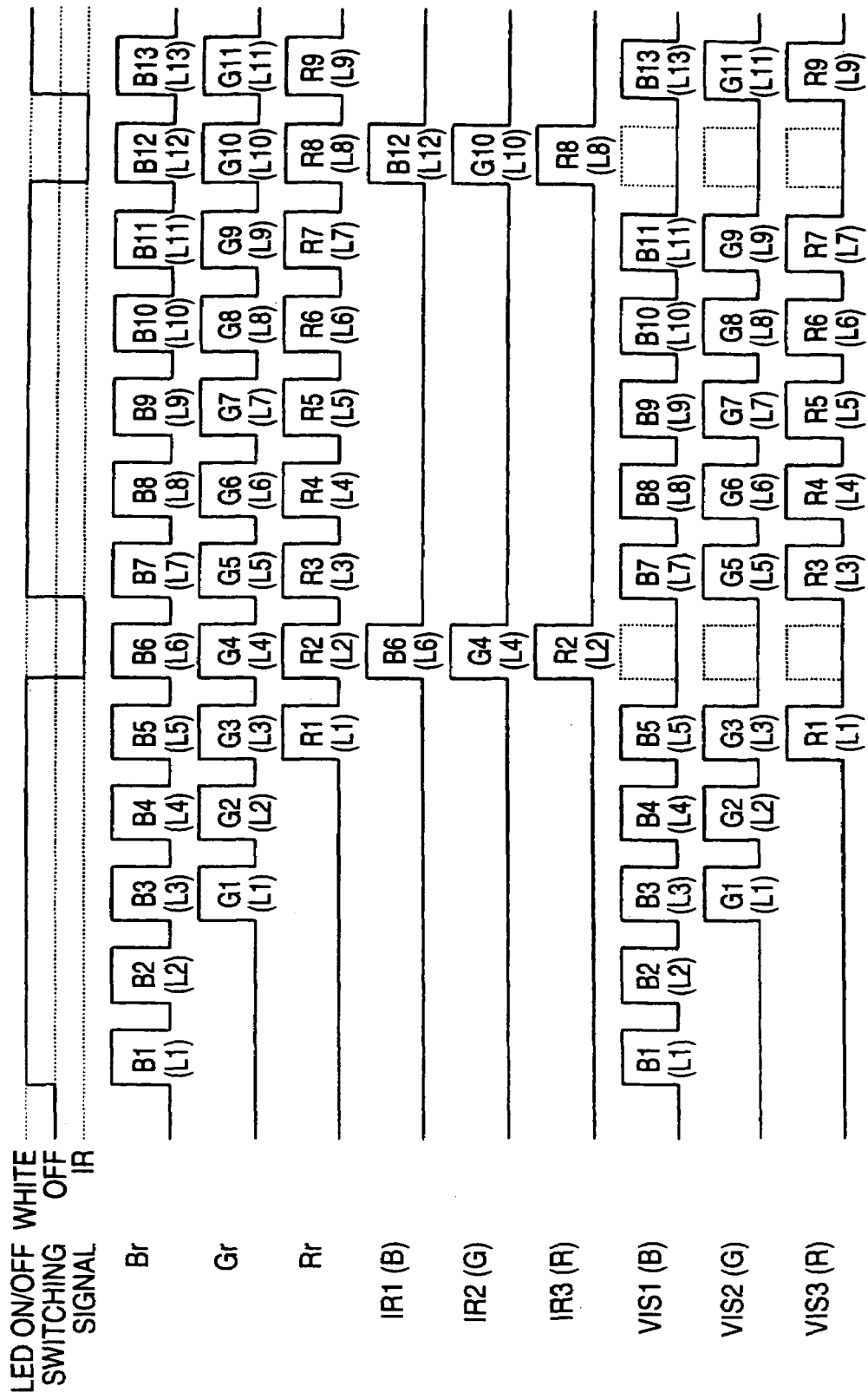
FIG. 14 is a timing chart for describing operations of an infrared/visible separator in a first reading mode.

FIG. 14 is a timing chart for describing operations of the infrared/visible separator 130 in the first reading mode.

The infrared/visible separator 130 receives the first, second, and third data Br, Gr, and Rr that have been converted into digital data and the LED on/off switching signal from the LED driver 83. Then, the infrared/visible separator 130 separates the first data Br into the first infrared data IR1(B) and the first visible data VIS1(B), the second data Gr into the second infrared data IR2(G) and the second visible data VIS2(G), and the third data Rr into the third infrared data IR3(R) and the third visible data VIS3(R) based on the input LED on/off switching signal.

This operation will be described in more detail. The infrared/visible separator 130 outputs the first, second, and third visible data VIS1(B), VIS2(G), and VIS3(R) based on the first, second, and third data Br, Gr, and Rr obtained from the blue, green, and red pixel lines 59B, 59G, and 59R, respectively, while the LED on/off switching signal for turning on the white LED 92 is output, i.e., while the white LED 92 is turned on. In addition, the infrared/visible separator 130 outputs the first, second, and third infrared data IR1(B), IR2(G), and IR3(R) based on the first, second, and third data Br, Gr, and Rr obtained from the blue, green, and red pixel lines 59B, 59G, and 59R, while the LED on/off switching signal for turning on the infrared LED 93 is output, i.e., while the infrared LED 93 is turned on.

In the example shown in FIG. 14, as for the first data Br, B1 to B13 excluding B6 and B12 are output as the first visible data VIS1(B), and B6 and B12 are output as the first infrared data IR1(B). In addition, as for the second data Gr, G1 to G11 excluding G4 and G10 are output as the second visible data VIS2(G), and G4 and G10 are output as the second infrared data IR2(G). Furthermore, as for the third data Rr, R1 to R9 excluding R2 and R8 are output as the third visible data VIS3(R), and R2 and R8 are output as the third infrared data IR3(R). The first, second, and third infrared data IR1(B), IR2(G), and IR3(R) are output to the infrared post-processing portion 200. Meanwhile, the first, second, and third visible data VIS1(B), VIS2(G), and VIS3(R) are output to the visible post-processing portion 300.

Now, operations of the infrared post-processing portion 200 in the first reading mode will be described.

Each of the first, second, and third infrared data IR1(B), IR2(G), and IR3(R) input to the infrared shading correction portion 230 of the infrared post-processing portion 200 is shading-corrected using the infrared shading data SHD(IR) read from the infrared shading data memory 220. By virtue of the infrared shading correction, it is possible to correct ununiformity in light intensity distribution of the infrared LED 93 for the horizontal scanning direction FS, or ununiformity in output values of each photodiode PD included in the blue, green, and red pixel lines 59B, 59G, and 59R for the infrared light. In addition, it is possible to correct level difference among the first, second, and third infrared data IR1(B), IR2(G) and IR3(R) caused by different transmittance in the infrared range. The first, second, and third infrared data IR1(B), IR2(G), and IR3(R) that have been shading-corrected in an infrared range are output to the rearranging portion 240.

Figure 15:
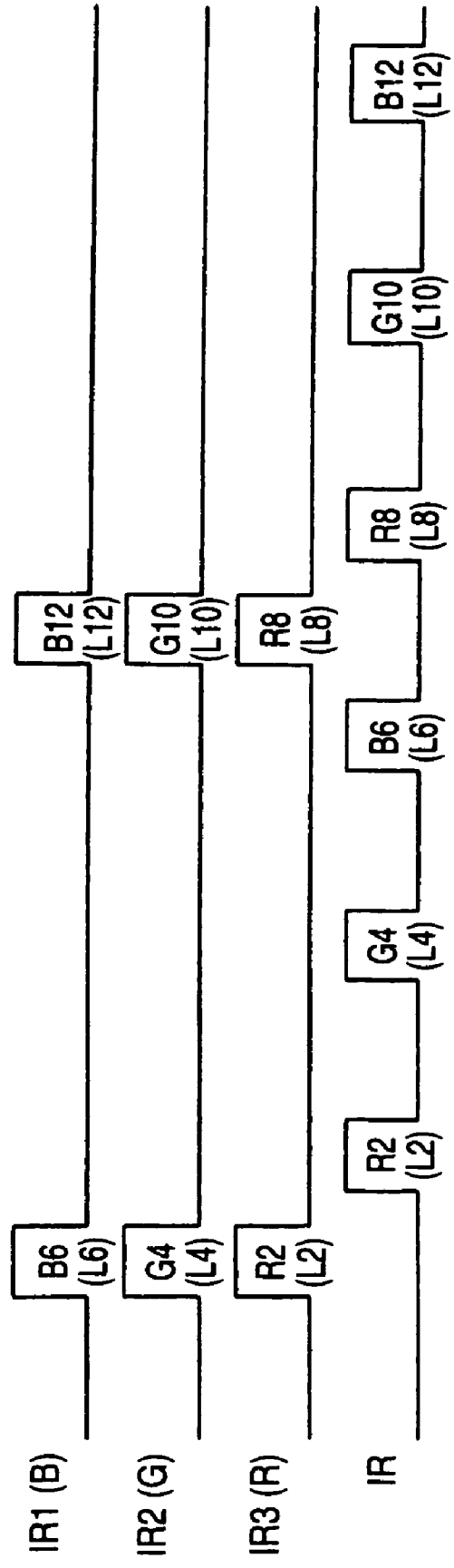
FIG. 15 is a timing chart for describing operations of a rearranging portion in a first reading mode.

FIG. 15 is a timing chart for describing operations of the rearranging portion 240 in the first reading mode.

The rearranging portion 240 receives the first, second, and third infrared data IR1(B), IR2(G), and IR3(R) that have been shading-corrected in the infrared range. As shown in FIG. 15, although the first, second, and third infrared data IR1(B6), IR2(G4), and IR3(R2) are simultaneously acquired, the third infrared data IR3(R2) is obtained by reading the second read line L2 on the original, the second infrared data IR2(G4) is obtained by reading the fourth read line L4 on the original, and the first infrared IR1(B6) is obtained by reading the sixth read line L6 on the original. In addition, although the first, second, and third infrared data IR1(B12), IR2(G10), and IR3(R8) are simultaneously acquired at the next chance, the third infrared data IR3(R8) is obtained by reading the eighth read line L8 on the original, the second infrared data IR2(G10) is obtained by reading the tenth read line L10 on the original, and the first infrared data IR1(B12) is obtained by reading the twelfth read line L12 on the original.

In other words, it is recognized that the first, second, and third infrared data IR1(B), IR2(G), and IR3(R) correspond to the output data obtained by reading even-numbered read lines L2, L4, L6, L8, L10, L12, . . . on the original.

The rearranging portion 240 receives the first, second, and third infrared data IR1(B), IR2(G), and IR3(R), and temporarily buffers them. Then, the rearranging portion 240 rearranges the third, second, and first infrared data IR3(R), IR2(G), and IR1(B) in this order and outputs them as the infrared data IR. As a result, the infrared data IR is output in the order of the even-numbered read lines L2, L4, L6, L8, L, L12, . . . . The infrared data IR is output to the identification information analyzing portion 250.

Figure 16:
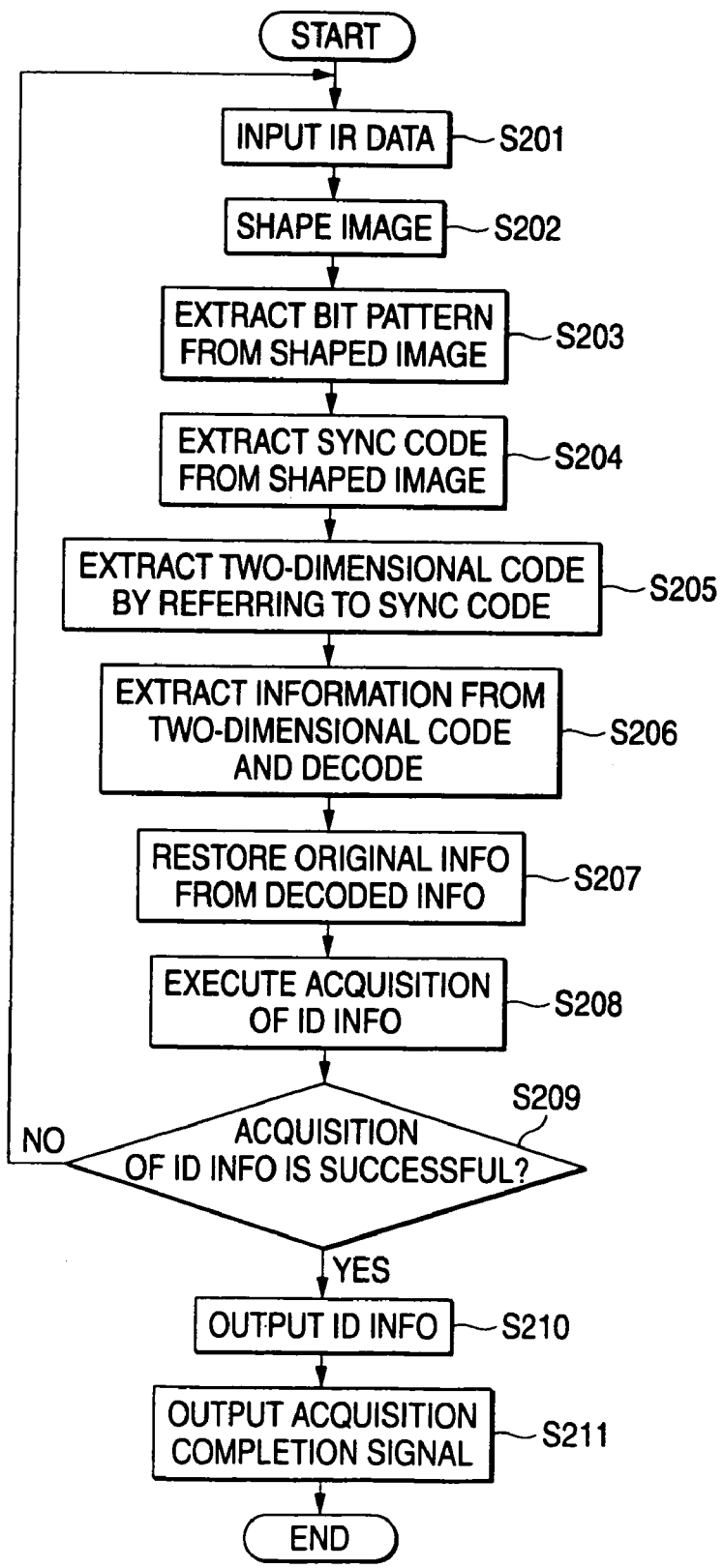
FIG. 16 is a flowchart illustrating a process flow performed in an identification information analyzing portion in a first reading mode.

FIG. 16 is a flowchart illustrating a process flow executed in the identification information analyzing portion 250 in the first reading mode.

When the infrared data IR is input from the rearranging portion 240 (step 201), the identification information analyzing portion 250 shapes the input infrared data IR (step 202). The shaping of the infrared data IR includes, for example, slanted-angle correction, noise elimination, and the like. In addition, the identification information analyzing portion 250 extracts a bit pattern (e.g., a slanted-line pattern) such as a slash "/" or a backslash "\" from the shaped infrared data IR (step 203). On the other hand, the identification information analyzing portion 250 extracts a synchronization code for determining the two-dimensional code position from the shaped infrared data IR (step 204). The identification information analyzing portion 250 extracts the two-dimensional code with reference to this synchronization code position (step 205) and extracts an error correction code (ECC) from the two-dimensional code and decodes the ECC (step 206). In addition, the identification information analyzing portion 250 restores the original code information from the decoded information (step 207).

Then, the identification information analyzing portion 250 tries to obtain identification information from the restored code information (step 208). Subsequently, it is determined whether or not the identification information has been successfully acquired (step 209). If it is determined that the identification information has been successfully acquired, the identification information analyzing portion 250 outputs the acquired identification information to the data combining portion 400 (refer to FIG. 5) (step 210). In addition, the identification information analyzing portion 250 outputs the acquisition completion signal representing that the acquisition of the identification information has been completed to the reading controller 81, the pre-processing portion 100, and the visible post-processing portion 300, and the like (step 211), so that a set of the processes are terminated.

On the other hand, in the step 209, if it is determined that the identification information cannot be obtained, the process returns to the step 201, and the identification information analyzing portion 250 continues to repeat the same process.

Now, operations of the visible post-processing portion 300 in the first reading mode will be described.

Each of the first, second, and third visible data VIS1(B), VIS2(G), and VIS3(R) input to the visible shading correction portion 330 of the visible post-processing portion 300 are shading-corrected using the visible shading data SHD(VIS) read from the visible shading data memory 320. By virtue of the visible shading correction, it is possible to correct ununiformity in light intensity distribution of the white LED 92 for the horizontal scanning direction FS, or ununiformity in output values of each photodiode PD included in the blue, green, and red pixel lines 59B, 59G, and 59R for the white light. The first, second, and third visible data VIS1(B), VIS2(G), and VIS3(R) that have been shading-corrected in a visible range are input to the delay processing portion 340.

Figures 17A, 17B, 17C:
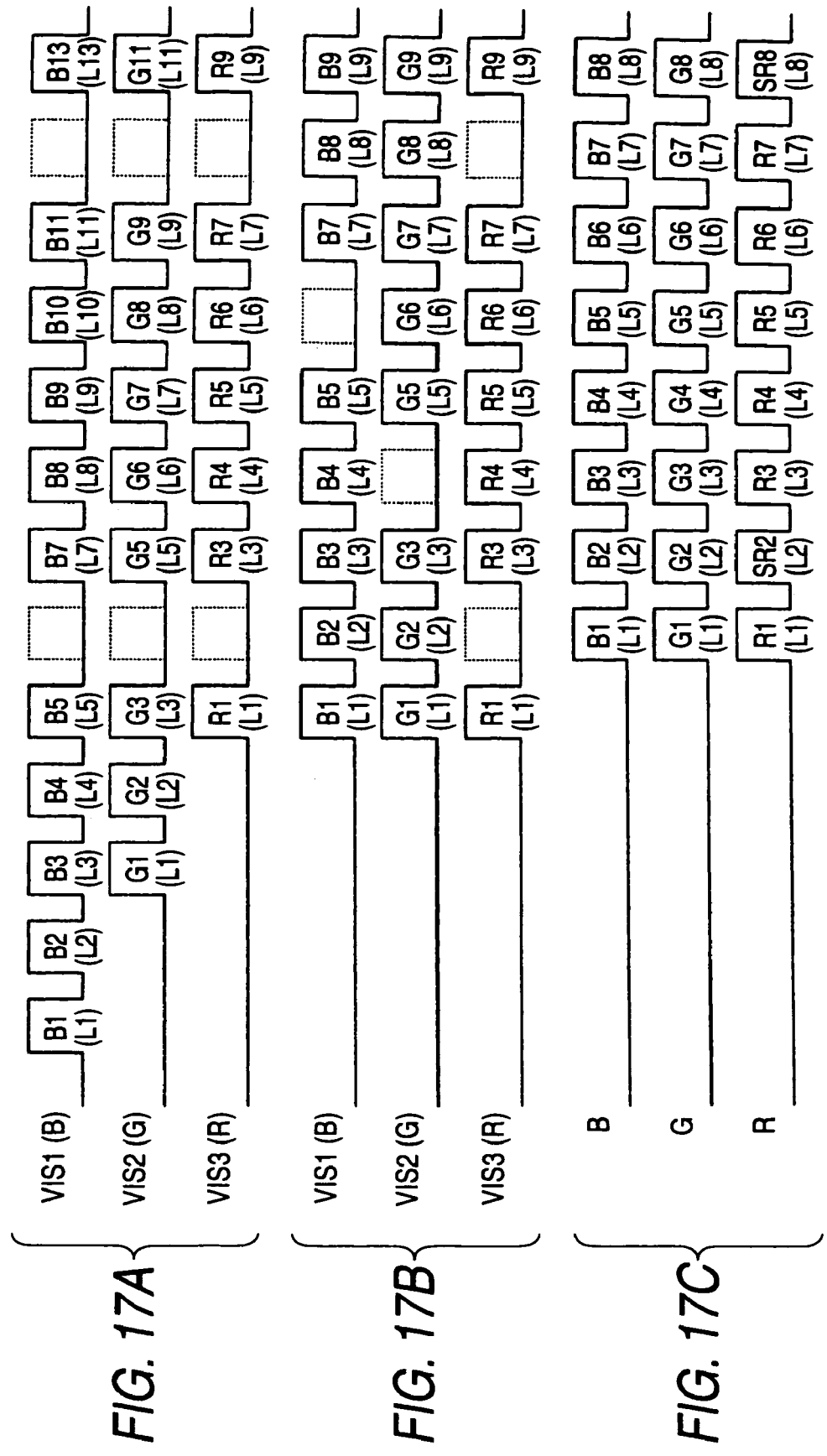
FIGS. 17A, 17B, and 17C are timing charts for describing operations of a delay processing portion, a data supplementing portion, and an image processing portion in a first reading mode.

FIG. 17 is a timing chart for describing operations of the delay processing portion 340, the data supplementing portion 350, and the image processing portion 360 in the first reading mode. Specifically, FIG. 17A illustrates the first, second, and third visible data VIS1(B), VIS2(G), and IVS3(R) input to the delay processing portion 340. In addition, FIG. 17B illustrates the first, second, and third visible data VIS1(B), VIS2(G), and VIS3(R) output from the delay processing portion 340. Furthermore, FIG. 17C illustrates image information (including blue, green, and red data B, G, and R) after the data supplementing process by the data supplementing portion 350 and the image processing by the image processing portion 360 have been performed.

The delay processing portion 340 receives the first, second, and third visible data VIS1(B), VIS2(G), and VIS3(R) that have been shading-corrected in a visible range. As described above, the second visible data VIS2(G) is delayed by 2 lines with respect to the first visible data VIS1(B), and the third visible data is delayed by 2 lines with respect to the second visible data VIS2(G).

Therefore, the delay processing portion 340 outputs the third visible data VIS3(R) without any delay, the first visible data VIS1(B) with a delay amount of 4 lines, and the second visible data VIS2(G) with a delay amount of 2 lines. As a result, the numbers X of the read lines of the first, second, and third visible data VIS1(B), VIS2(G), and VIS3(R) are coincident with one another when they are simultaneously output from the delay processing portion 340. The first, second, and third visible data VIS1(B), VIS2(G), and VIS3(R) that have been delayed are input to the data supplementing portion 350.

In the first, second, and third visible data VIS1(B), VIS2(G), and VIS3(R), the data corresponding to one line is omitted every 5 lines due to the infrared/visible separation in the aforementioned infrared/visible separator 130.

Therefore, the data supplementing portion 350 supplements the omitted data in the first, second, and third visible data VIS1(B), VIS2(G), and VIS3(R) and outputs them. For example, although the data to be inserted between VIS1(B5) and VIS1(B7) (shown as dotted lines in the drawing) is omitted in the first visible data VIS1(B), the data supplementing portion 350 supplements VIS1(SB6) in this position. In addition, for example, although the data to be inserted between VIS2(G3) and VIS2(G5) is omitted in the second visible data VIS2(G), the data supplementing portion 350 supplements VIS2(SG4) in this position. Furthermore, the data to be inserted between VIS3(R1) and VIS3(R3) and the data VIS3(R7) and VIS3(R9) are omitted in the third visible data VIS3(R), the data supplementing portion 350 supplements VIS3(SR2) and VIS3(SR8) in these positions, respectively.

More specifically, for example, the omitted line may be supplemented by averaging using the values of 6 pixels (3 leading pixels and 3 trailing pixels) available in 3×3 matrix centering on a target pixel with respect to the omitted line. Otherwise, the omitted line may be simply supplemented by averaging leading and trailing pixels in a vertical scanning direction. Also, other methods may be used.

The image processing portion 360 performs a predetermined image processing for the first, second, and third visible data VIS1(B), VIS2(G), and VIS3(R) that have been supplemented by the data supplementing portion 350. In addition, the blue color data B obtained by processing the first visible data VIS1(B), the green color data G obtained by processing the second visible data VIS2(G), and the red color data R obtained by processing the third visible data VIS3(R) are output to the data combining portion 400 (refer to FIG. 5) as image information.

Now, the second reading mode in the step 110 will be described with reference to FIGS. 18 to 20. It should be noted that the second reading mode is executed after the identification information analyzing portion 250 of the infrared post-processing portion 200 completes the analysis of the identification information and the acquisition completion signal has been output while the original is being read in the first reading mode as described above.

Figure 18:
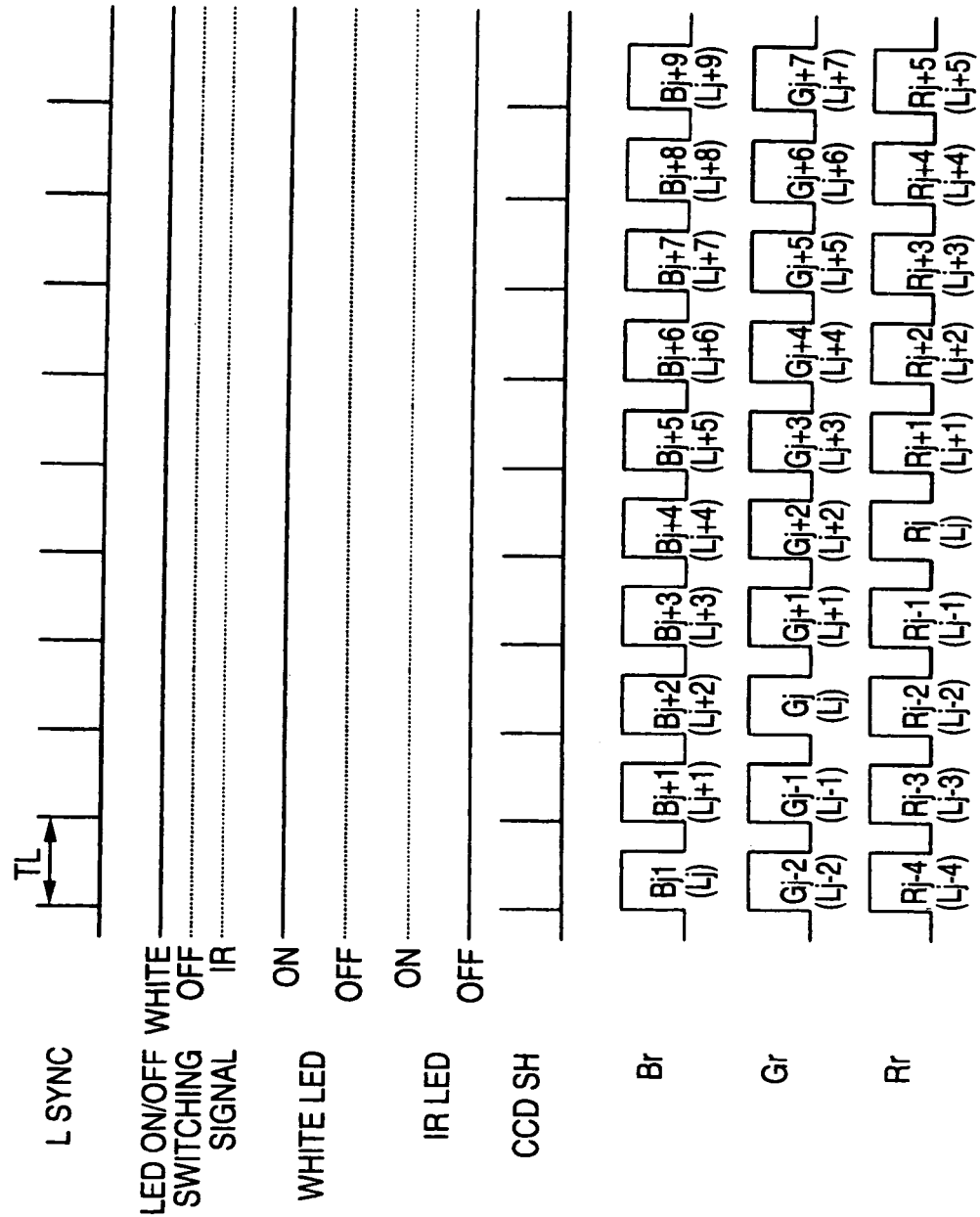
FIG. 18 is a timing chart illustrating relationships among a line synchronization signal, an LED on/off switching signal, turning-on/off of a white LED and an infrared LED, a CCD capture signal, and first, second, and third data in a second reading mode.

FIG. 18 is a timing chart illustrating relationships among the line synchronization signal Lsync, the LED on/off switching signal, the turning-on/off of the white LED 92 and the infrared LED 93, the CCD capture signal CCD SH, and the first, second, and third data Br, Gr, and Rr in the second reading mode.

In the second reading mode, the CCD driver 82 outputs the LED on/off switching signal for always turning on the white LED 92 to the LED light source 55.

The LED light source 55 always turns on the white LED 92 in response to this LED on/off switching signal.

In addition, the CCD driver 82 outputs the CCD capture signal CCD SH synchronized with the line synchronization signal Lsync to the CCD image sensor 59 (including the blue, green, and red pixel lines 59B, 59G, and 59R). The blue, green, and red pixel lines 59B, 59G, and 59R sequentially output the first, second, and third data Br, Gr, and Rr, respectively, as the read data for one line in a horizontal scanning direction in response to this CCD capture signal CCD SH.

In this case, the blue, green, and red pixel lines 59B, 59G, and 59R are spaced with an interval of 2 lines in a vertical scanning direction as described above. Therefore, for example, when the blue pixel line 59B captures the first data Br(Bj) corresponding to the jth read line Lj, the green pixel line 59G captures the second data Gr(Gj−2) corresponding to the (j−2)th read line Lj−2, and the red pixel line 59R captures the third data Rr(Rj−4) corresponding to the (j−4)th read line Lj−4.

Figure 19:
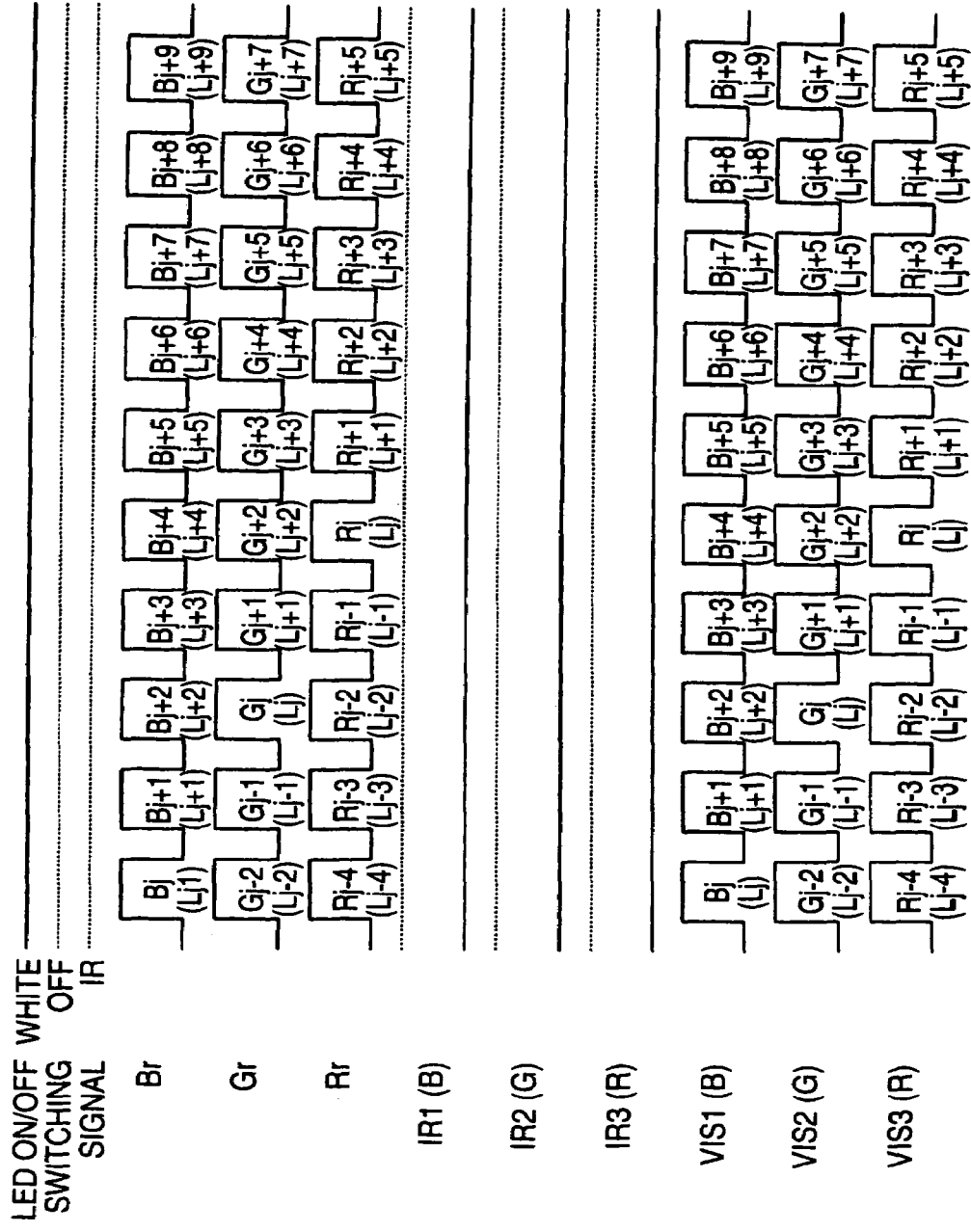
FIG. 19 is a timing chart for describing operations of an infrared/visible separator in a second reading mode.

FIG. 19 is a timing chart for describing operations of the infrared/visible separator 130 in the second reading mode.

In the second reading mode, the LED on/off switching signal for always turning on the white LED 92 is output. For this reason, the infrared/visible separator 130 outputs the first, second, and third data Br, Gr, and Rr as the first, second, and third visible data VIS1(B), VIS2(G), and VIS3(R) without any change. Therefore, null data are continuously output for the first, second, and third infrared data IR1(B), IR2(G), and IR3(R).

As a result, the infrared post-processing portion 200 stops its operation during the second reading mode is executed.

Now, operations of the visible post-processing portion 300 in the second reading mode will be described.

Each of the first, second, and third visible data VIS1(B), VIS2(G), and VIS3(R) input to the visible shading correction portion 330 of the visible post-processing portion 300 is shading-corrected using the visible shading data SHD(VIS) read from the visible shading data memory 320. The first, second, and third visible data VIS1(B), VIS2(G), and VIS3 (R) that have been shading-corrected in a visible range are input to the delay processing portion 340.

Figures 20A, 20B, 20C:
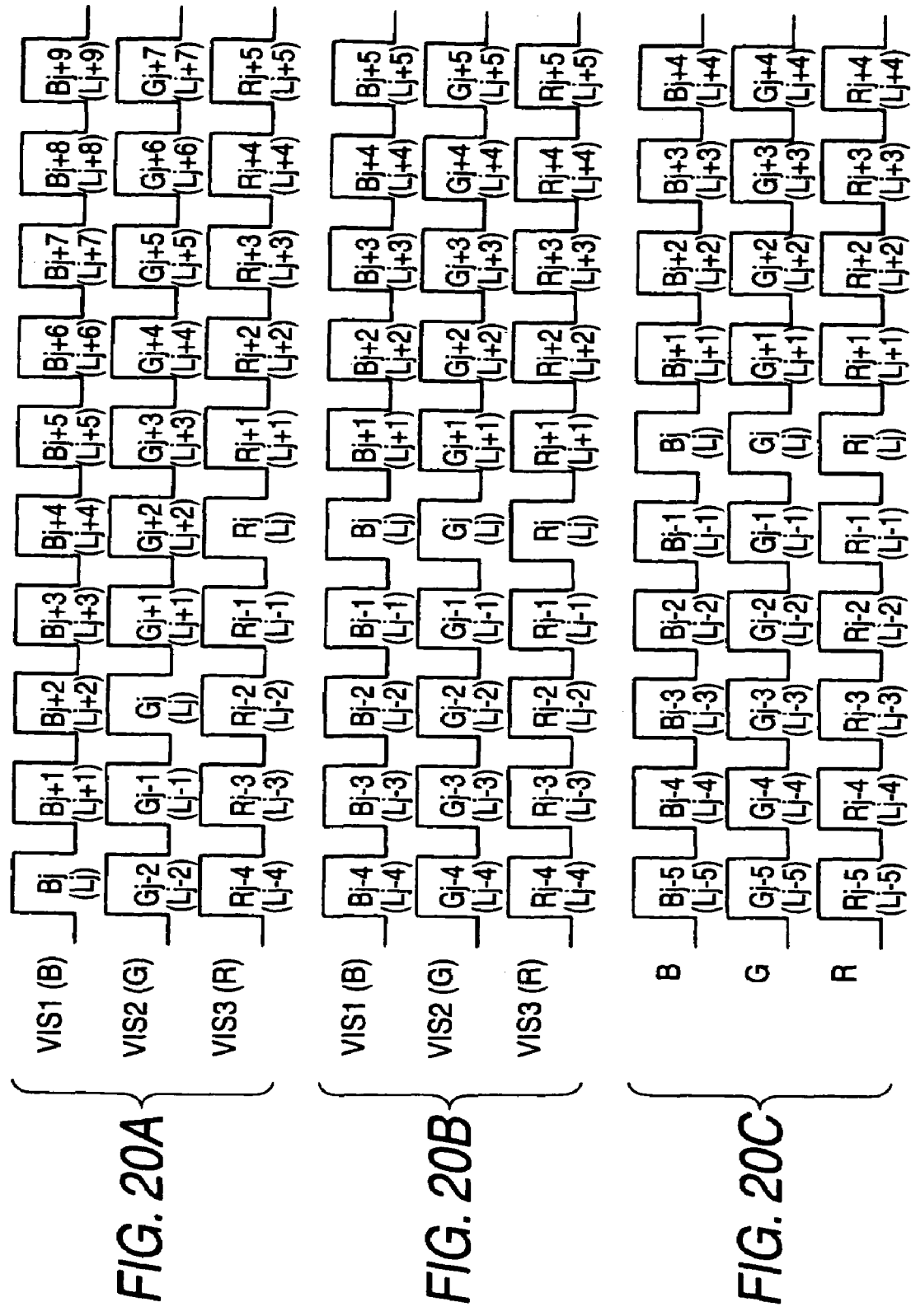
FIGS. 20A, 20B, and 20C are timing charts for describing operations of a delay processing portion, a data supplementing portion, and an image processing portion in a second reading mode.

FIGS. 20A, 20B, and 20C are timing charts for describing operations of the delay processing portion 340, the data supplementing portion 350, and the image processing portion 360 in the second reading mode. Specifically, FIG. 20A shows the first, second, and third visible data VIS1(B), VIS2 (G), and VIS3(R) input to the delay processing portion 340. In addition, FIG. 20B shows the first, second, and third visible data VIS1(B), VIS2(G), and VIS3(R) output from the delay processing portion 340. Furthermore, FIG. 20C shows the output image data (including the blue, green, and red color data B, G, and R) output from the image processing portion 360

In the second reading mode, the first, second, and third data Br, Gr, and Rr are respectively input as the first, second, and third visible data VIS1(B), VIS2(G), and VIS3(R) without separation in the infrared/visible separator 130 as described above. For this reason, in the second reading mode, the data supplementing portion 350 does not necessarily supplement data, and outputs the first, second, and third visible data VIS1(B), VIS2(G), and VIS3(R) input from the delay processing portion 340 without any change. In addition, whether or not the data supplementing should be performed in the data supplementing portion 350 depends on whether or not the acquisition completion signal has been input from the identification information analyzing portion 250. In other words, since some of the first, second, and third visible data VIS1(B), VIS2(G), and VIS3(R) are omitted due to the separation process executed in the infrared/visible separator 130 until the acquisition of the identification information in the identification information analyzing portion 250 is completed, the data is supplemented. On the other hand, after the acquisition of the identification information is completed, the separation process is not executed in the infrared/visible separator 130, and none of the first, second, and third visible data VIS1(B), VIS2(G), and VIS3(R) is omitted. Therefore, the data supplementing is not performed.

Then, a predetermined image processing is performed in the image processing portion 360 for the first, second, and third visible data VIS1I(B), VIS2(G), and VIS3(R) that have passed through the data supplementing portion 350. Accordingly, the blue color data B obtained by performing an image processing for the first visible data VIS1(B), the green color data G obtained by performing an image processing for the second visible data VIS2(G), and the red color data R obtained by performing an image processing for the third visible data VIS3(R) are output to the data combining portion 400 as image information.

In addition, the identification information input from the infrared post-processing portion 200 is combined in the data combining portion 400 with the blue, green, and red color data B, G, and R corresponding to image information output from the visible post-processing portion 300, and then output to devices in the subsequent stage.

FIG. 21 illustrates various image data output in the first reading mode. Specifically, FIGS. 21A, 21B, and 21C illustrate the blue, green, and red color data B, G, and R, respectively, output from the image processing portion 360 of the visible post-processing portion 300. In addition, FIG. 21D illustrates the infrared data IR output from the rearranging portion 240 of the infrared post-processing portion 200.

Figure 21A:
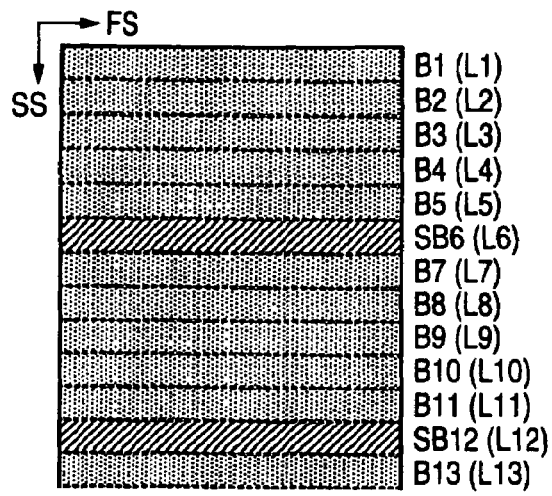
FIGS. 21A, 21B, 21C, and 21D are diagrams illustrating blue, green, and red color and infrared data output respectively in a first reading mode.

For example, in case of the blue color data B shown in FIG. 21A, the data (B1-B5, B7-B11, B13- . . . in the example shown in the drawing) obtained from the first data Br captured by the blue pixel line 59B when the white LED 92 is turned on, and the supplemented data (SB6, SB12, . . . in the example shown in the drawing) obtained from the data supplementing portion 350 based on the data obtained from the first data Br are alternately output.

Figure 21B:
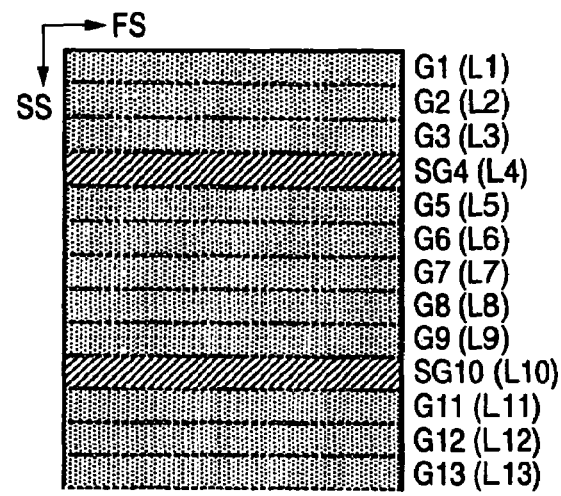

In addition, for example, in case of the green color data G shown in FIG. 21B, the data (G1-G3, G5-G9, G1-G13, . . . in the example shown in the drawing) obtained from the second data Gr captured by the green color pixel line 59G when the white LED 92 is turned on and the supplemented data (SG4, SG10, . . . in the example shown in the drawing) obtained by the data supplementing portion 350 based on the data obtained from the second data Gr are alternately output.

Figure 21C:
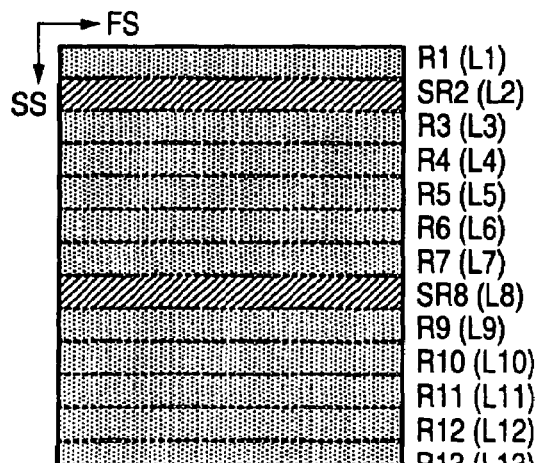

Furthermore, for example, in case of the red data R shown in FIG. 21C, the data (R1, R3-R7, R9-R13, . . . in the example shown in the drawing) obtained from the third data Rr captured by the red pixel line 59R when the white LED 92 is turned on and the supplemented data (SR2, SR8, . . . in the example shown in the drawing) obtained by the data supplementing portion 350 based on the data obtained from the third data Rr are alternately output.

In other words, in the first reading mode, the data corresponding to 5 lines in a vertical scanning direction obtained based on each output data from blue, green, and red pixel lines 59B, 59G, and 59R and the supplemented data corresponding to 1 line in a vertical scanning direction obtained based on this data are alternately output for the blue, green, and red color data B, G, and R. As a result, the output data corresponding to the read line Lx(only L1-L13 are shown in FIG. 21) on the original shown in FIG. 11 are obtained from the blue, green, and red color data B, G, and R.

Figure 21D:
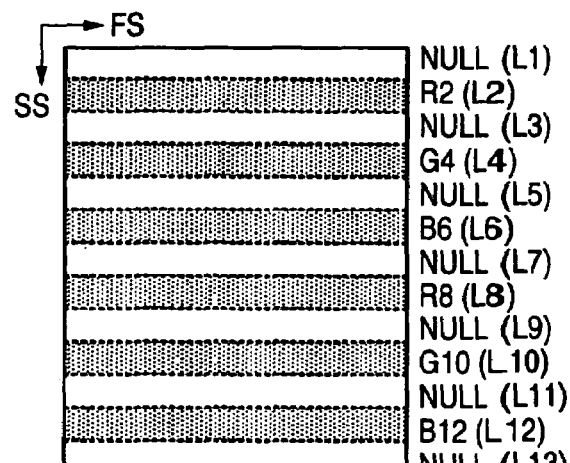

On the contrary, in case of the infrared data IR shown in FIG. 21D, the data obtained when the infrared LED 93 is turned on are sequentially output. Specifically, first of all, the data (R2 in the example shown in the drawing) obtained from the third data Rr captured by the red pixel line 59R, the data (G4 in the example shown in the drawing) obtained from the second data Gr captured by the green pixel line 59G, and the data (B6 in the example shown in the drawing) obtained from the first data Br captured by the blue pixel line 59B are sequentially output.

Subsequently, the data (R8 in the example shown in the drawing) obtained from the third data Rr captured by the red pixel line 59R, the data (G10 in the example shown in the drawing) obtained from the second data Gr captured by the green pixel line 59G, and the data (B12 in the example shown in the drawing) obtained from the first data Br captured by the blue pixel line 59B are sequentially output. Similarly, in the subsequent stages, the data obtained from the third data Rr captured by the red pixel line 59R, the data obtained from the second data Gr captured by the green pixel line 59G, and the data obtained from the first data Br captured by the blue pixel line 59B are sequentially output.

In other words, in case of the infrared data IR in the first reading mode, the data corresponding to one line in a vertical scanning direction, obtained based on each output data from the red, green, and blue pixel lines 59R, 59G, and 59B, are sequentially output. In this case, the output data corresponding to even-numbered read lines L2, L4, L6, L8, L10, L12, . . . of the read lines Lx on the original shown in FIG. 11 are obtained using the infrared data IR. On the contrary, the data corresponding to the odd-numbered read lines L1, L3, L5, L7, L9, L11, L13, . . . are set to null.

Accordingly, the vertical scanning resolutions of the blue, green, and red color data B, G, and R and the infrared data IR in the first reading mode are set as follows.

Assuming that X denotes the number of lines read by each of the blue, green, and red pixel lines 59B, 59G, and 59R in a vertical scanning direction of the original, the number of blue read lines corresponding to the first visible data VIS1(B) used to output the blue color data B is 5X/6. In addition, the number of the green read lines corresponding to the second visible data VIS2(G) used to output the green data G and the number of red read lines corresponding to the third visible data VIS3(R) used to output the red color data R are also 5X/6. However, according to the present embodiment, the omitted line having the number of X/6 is supplemented for the first visible data VIS1(B) when the blue color data B is output. Similarly, the omitted lines having the number of X/6 are supplemented for the second visible data VIS2(G) when the green color data G is output and for the third visible data VIS3(R) when the red color data R is output. Therefore, the blue, green, and red color data B, G, and R are substantially obtained from the number X of read lines.

On the other hand, assuming that X denotes the number of the lines read in a vertical scanning direction on the original, the number of infrared read lines corresponding to the first infrared data IR1(B) used to output the infrared data IR is X/6. In addition, the numbers of the infrared read lines corresponding to the second infrared data IR2(G) used to output the infrared data IR is X/6 as well as that corresponding to the third infrared data IR3(R) used to output the infrared data IR which is also X/6. For this reason, the sum of numbers of the infrared read lines used to output the infrared data IR is X/6+X/6+X/6=X/2. Therefore, the infrared data IR are obtained from a half of the number of read lines X/2 in comparison with the blue, green, and red color data B, G, and R.

As described above, in case of the infrared data IR, the number of the read lines becomes a half of the number of the lines substantially read for the blue, green, and red color data B, G, and R. This means that the vertical scanning resolution for the infrared data IR becomes a half of the vertical scanning resolution of the blue, green, and red color data B, G, and R. Therefore, when the vertical scanning resolution for the blue, green, and red color data B, G, and R is set to 600 spi, the vertical scanning resolution of the infrared data IR becomes 300 spi.

In this case, supposing that the number of pixel lines used to read an image is m, and an interval (gap) between neighboring pixel lines is n, a relationship between a turn-on period T1 of the white LED 92 and a turn-on period T2 of the infrared LED 93 can be expressed as:

$$T1=(m \times n-1) \times T2 \qquad (1).$$

In the present embodiment, since m is set to 3 and n is set to 2, the turn-on period T1 of the white LED 92 is set to be five times of the turn-on period T2 of the infrared LED 93 as apparent from FIG. 13. However, in the present exemplary embodiment, the first, second, and third visible data VIS1(B), VIS2(G), and VIS3(R) are respectively obtained from the blue, green, and red pixel lines 59B, 59G, and 59R, but the infrared data IR is obtained by summing the data obtained from the blue, green, and red pixel lines 59B, 59G, and 59R. Therefore, the ratio between both data is not 5:1 but 5:3.

In addition, supposing that the vertical scanning resolution for the blue, green, and red color data B, G, and R (i.e. the vertical scanning resolution of the first data) is called a visible vertical scanning resolution Res(VIS), and the vertical scanning resolution of the infrared data IR (i.e., the vertical scanning resolution of the second data) is called an infrared vertical scanning resolution Res(IR), a relationship between the visible vertical scanning resolution Res(VIS) and the infrared vertical scanning resolution Res(IR) can be expressed as:

$$\mathrm{Res}(IR)=\mathrm{Res}(VIS)/n \qquad (2).$$

In the present exemplary embodiment, since n is set to 2, the infrared vertical scanning resolution Res(IR) is a half of the visible vertical scanning resolution Res(VIS). Therefore, when it is desired to make the infrared vertical scanning resolution Res(IR) and the visible vertical scanning resolution Res(VIS) to have the same level, it is preferable to use a CCD image sensor 59 having a line gap of 1 (i.e., n=1). That is, when a CCD image sensor 59 having a line gap of 3 (i.e., n=3) is used, the resultant infrared vertical scanning resolution Res(IR) becomes ⅓ of the visible vertical scanning resolution Res(VIS). The relationship between the visible and infrared vertical scanning resolutions Res(VIS) and Res(IR) may be appropriately set according to the size of the code image in the invisible image on the original to be read. In addition, since the horizontal scanning resolution is determined based on an arrangement interval of the photodiodes PD installed in the blue, green, and red pixel lines 59B, 59G, and 59R, the horizontal scanning resolution is constant regardless of whether the visible light or the infrared light is used.

For example, in the present exemplary embodiment, as shown in FIG. 9, one unit of the two-dimensional code has a size of 0.3 mm×0.3 mm (300 μm×300 μm), and a backslash "\" or a slash "/" is formed inside as the invisible image. In addition, when the invisible image is read, the horizontal scanning resolution is set to 600 spi, and the infrared vertical scanning resolution Res(IR) is set to 300 spi as described above. Since the horizontal scanning resolution is set to 600 spi, the horizontal scanning length per one sample becomes about 42.3 μm. In addition, since the infrared vertical scanning resolution Res(IR) is set to 300 spi, the vertical scanning length per one sample becomes about 84.7 μm. Therefore, since one unit of the two-dimensional code is read at least in a size of 6 spots (in a horizontal scanning direction)×3 spots (in a vertical scanning direction), the content of the code image included in the invisible image can be sufficiently obtained by performing the reading in this resolution.

Figure 22A:
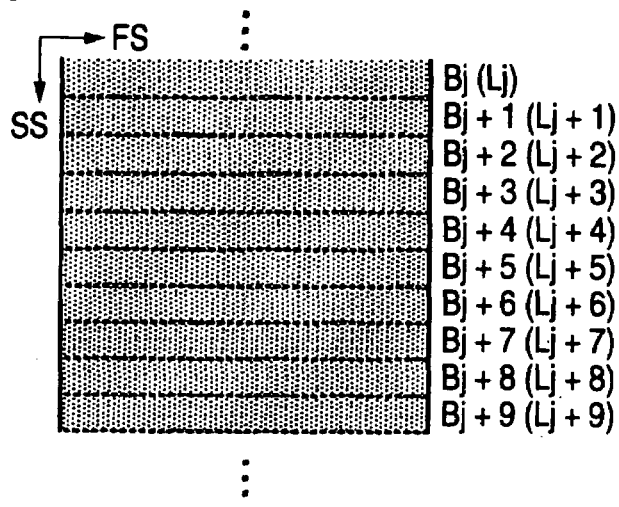
FIGS. 22A, 22B, and 22C are diagrams illustrating blue, green, and red color data output respectively in a second reading mode.
Figure 22B:
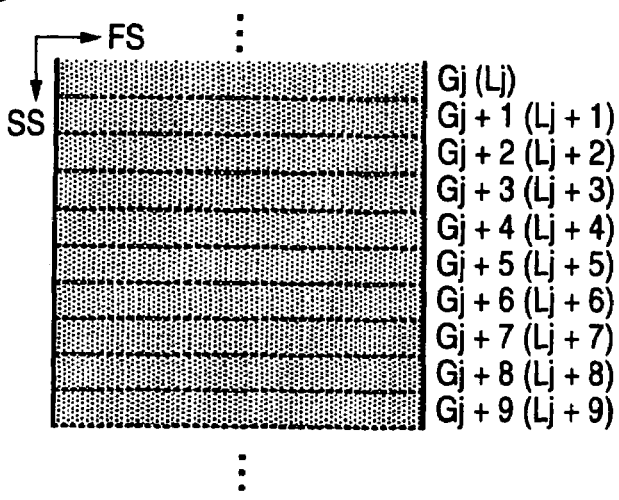
Figure 22C:
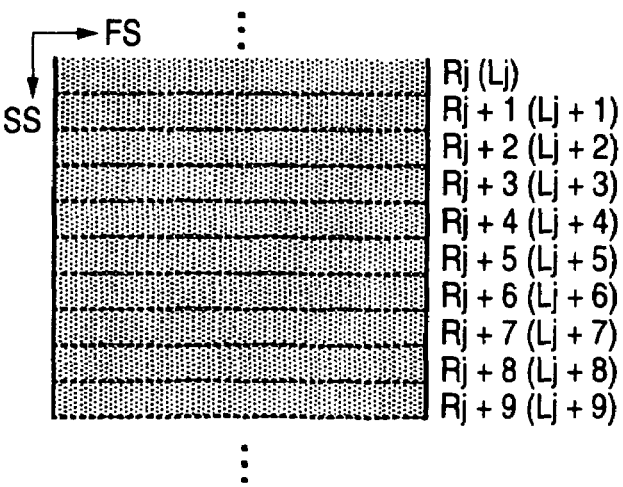

On the other hand, FIG. 22 illustrates various image data output in the second reading mode. Specifically, FIGS. 22A, 22B, and 22C show the blue, green, and red color data B, G, and R, respectively, output from the image processing portion 360 of the visible post-processing portion 300. In addition, since the infrared data IR is not output in the second reading mode as described above, the infrared data IR is not shown.

For example, in case of the blue color data B shown in FIG. 22A, the data (Bj to Bj+9, . . . in the example shown in the drawing) obtained from the first data Br captured by the blue pixel line 59B when the white LED 92 is turned on are output.

In addition, in case of the green color data G shown in FIG. 22B, the data (Gj to Gj+9, . . . in the example shown in the drawing) obtained from the second data Gr captured by the green pixel line 59G when the white LED 92 is turned on are output.

Furthermore, in case of the red color data R shown in FIG. 22C, the data (Rj to Rj+9, . . . in the example shown in the drawing) obtained from the third data Rr captured by the red pixel line 59R when the white LED 92 is turned on are output.

That is, in the second reading mode, the data corresponding to each read line in a vertical scanning direction, obtained from on the data output from the blue, green, and red pixel lines 59B, 59G, and 59R, are sequentially output for the blue, green, and red color data B, G, and R. As a result, the output data corresponding to the read lines Lx (only Lj to Lj+9 are shown in FIG. 22) on the original shown in FIG. 11 can be obtained for the blue, green, and red data B, G, and R without supplementing data.

Accordingly, in the second reading mode, the vertical scanning resolution Res(VIS) for the blue, green, and red data B, G, and R becomes 600 spi without change.

In the present exemplary embodiment, although the read operation of the original having visible and invisible images has been described, the image reading apparatus may read the original having only the visible image. In this case, an attempt to obtain the identification information (refer to the step 208 of FIG. 16) is continuously performed until the read operation for one page of the original is completed. However, even if the identification information cannot be obtained, the next operation can be continued when the read operation for the original is completed (refer to the step 109 of FIG. 10), and any problem does not particularly occur.

In addition, although the present exemplary embodiment has been described by exemplifying the read operations for the visible and infrared range images, a plurality of wavelength ranges (including the first and second wavelength rages) functioning as a reading target may be used, and the present invention is not limited thereto.

Furthermore, although the present exemplary embodiment has been described by exemplifying the original-movable reading mode, the present invention is not limited thereto, and the present embodiment may be similarly applied to the original-fixed reading mode.

Second Exemplary Embodiment

The second exemplary embodiment is similar to the first exemplary embodiment except that a period for generating the line synchronous signals Lsync, i.e., a line period TL is changed between, when the white LED 92 is turned on and when the infrared LED 93 is turned on. In addition, in the second exemplary embodiment, like reference numerals will be used for like elements of the first exemplary embodiment, and their detailed descriptions will be omitted.

Figure 23:
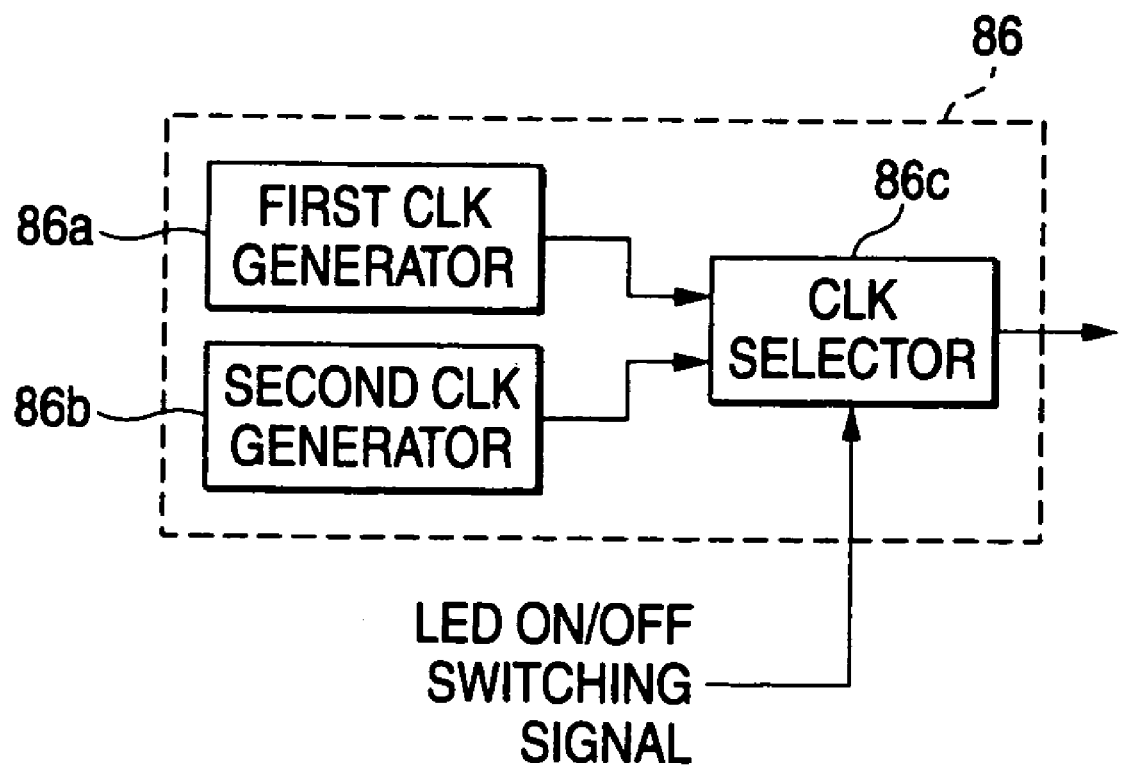
FIG. 23 is a diagram illustrating an exemplary construction of a VCLK generator according to a second exemplary embodiment of the present invention.

FIG. 23 is a diagram illustrating an exemplary construction of a VCLK generator 86 according to the second exemplary embodiment. The VCLK generator 86 includes a first clock generator (a first CLK generator) 86a, a second clock generator (a second CLK generator) 86b, and a clock selector (a CLK selector) 86c. The first CLK generator 86a generates a first video clock with a predetermined frequency (for example, 60 MHz). In addition, the second CLK generator 86b generates a second video clock with a frequency twice the predetermined frequency (for example, 120 MHz). Furthermore, the CLK selector 86c selectively outputs the first video clock generated from the first CLK generator 86a or the second video clock generated from the second CLK generator 86b based on the LED on/off switching signal input from the LED driver 83. Specifically, the first video clock is output as a video clock when the LED on/off switching signal for turning on the white LED 92 is output, and the second video clock is output as a video clock when the LED on/off switching signal for turning on the infrared LED 93 is output.

Similarly to the first exemplary embodiment, the line synchronization signal generator 87 shown in FIG. 5 is designed to assert the line synchronization signal Lsync every time the count of the video clock input from the VCLK generator 86 is coincident with a predetermined setup value. Therefore, the line synchronization generator 87 asserts the line synchronization signal Lsync with a first line period TL1 while the first video clock is input. In addition, the line synchronization signal generator 87 asserts the line synchronization signal Lsync with a second line period TL2 which is a half of the first line period TL1 while the second video clock is input.

According to the second exemplary embodiment, the sequence of executing the first reading mode is different from that of the first exemplary embodiment.

Now, the first reading mode according to the second exemplary embodiment will be described with reference to FIGS. 24 to 26.

Figure 24:
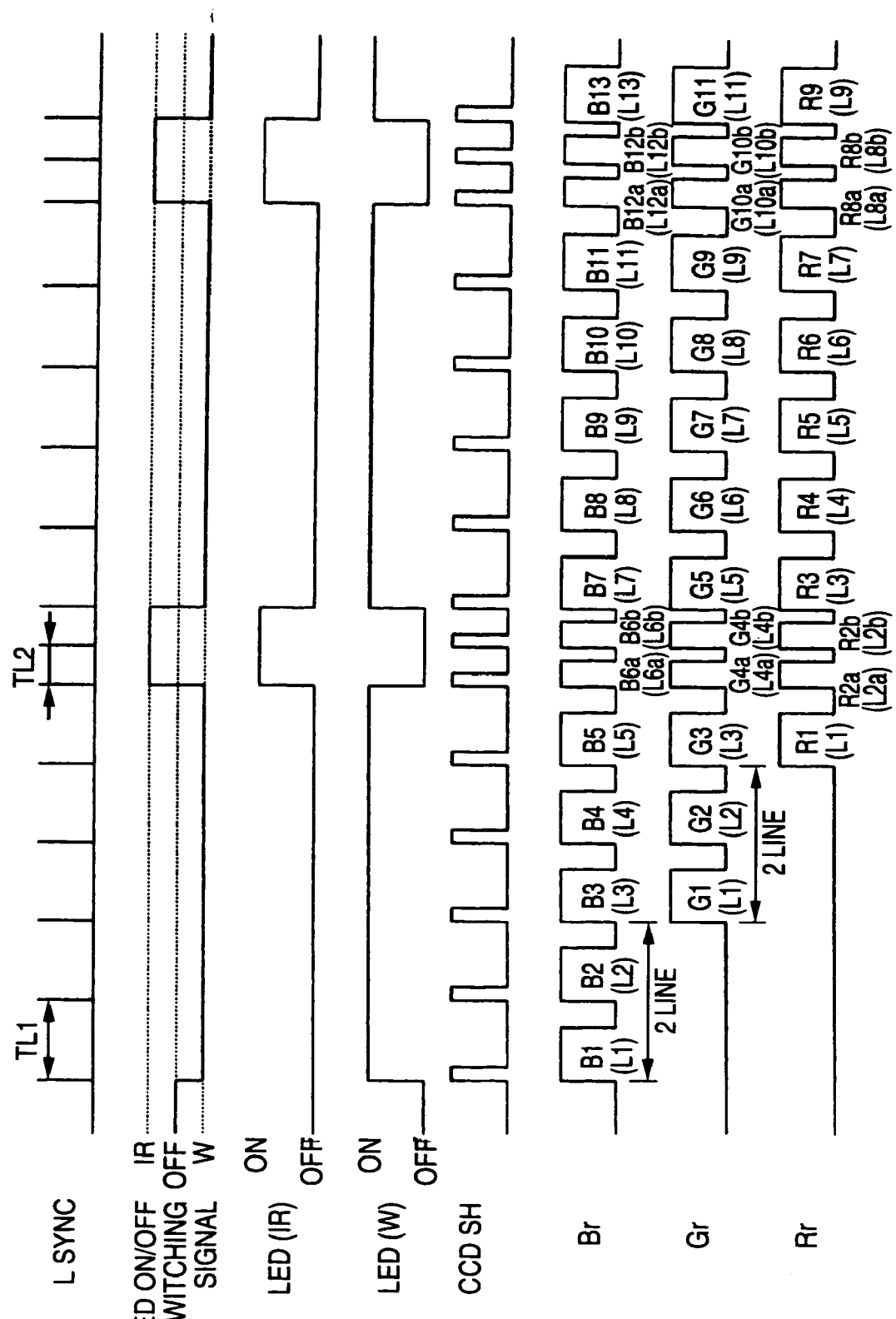
FIG. 24 is a timing chart illustrating relationships among a line synchronization signal, an LED on/off switching signal, turning-on/off of a white LED and an infrared LED, a CCD capture signal, and first, second, and third data in a first reading mode.

FIG. 24 is a timing chart illustrating relationships among the line synchronization signal Lsync, the LED on/off switching signal, turning-on/off of the white LED 92 and the infrared LED 93, the CCD capture signal CCD SH, and the first, second, and third data Br, Gr, and Rr in the first reading mode.

When the first reading mode is initiated, the LED driver 83 outputs the LED on/off switching signal based on the line synchronous signal Lsync input through the reading controller 81. Specifically, the LED driver 83 counts the number of assertions of the line synchronization signal Lsync, and outputs to the CLK selector 86c of the VCLK generator 86 or the LED light source 55, an LED on/off switching signal for turning on only the white LED 92 for five lines including the first to fifth counts and turning on only the infrared LED 93 for 2 lines including sixth and seventh counts.

In this case, the CLK selector 86c of the VCLK generator 86 switches the output video signal into the first or second video clock according to the LED on/off switching signal input from the LED driver 83. Accordingly, the line synchronization signal generator 87 repeats an operation of asserting the line synchronization signal Lsync with the first line period TL1 while the white LED 92 is turned on and with the second line period TL2 while the infrared LED 93 is turned on.

In response to this LED on/off switching signal, the LED light source 55 repeats the on/off switching operation for turning on only the white LED 92 for five periods (corresponding to five lines) of the first line period TL1 and turning on only the infrared LED 93 for two periods (corresponding to 2 lines) of the next second line period TL2.

Meanwhile, the CCD driver 82 outputs the line synchronization signal Lsync synchronized with the CCD capture signal CCD SH to the CCD image sensor 59 including the blue, green, and red pixel lines 59B, 59G, and 59R). In response to this CCD capture signal CCD SH, the blue, green, and red pixel lines 59B, 59G, and 59R sequentially outputs the first, second, and third data Br, Gr, and Rr as the read data for one line in a horizontal scanning direction.

In this case, similar to the first exemplary embodiment, 2 lines are delayed for each of the first, second, and third data Br, Gr, and Rr output from the blue, green, and red pixel lines 59B, 59G, and 59R, respectively. For example, in case of the first data Br, the acquisition period of the first data Br (B6a, B6b, B12a, B12b, . . . ) obtained when the infrared LED 93 is turned on is a half of the acquisition period of the first data Br(B1~B5, B7~B11, B13, . . . ) obtained when the white LED 92 is turned on. This also applies to the second and third data Gr and Rr.

Now, operations of the infrared/visible separator 130 of the pre-processing portion 100 in the first reading mode will be described with reference to the timing chart of FIG. 25.

The infrared/visible separator 130 receives the first, second, and third data Br, Gr, and Rr that have been converted into digital signals in the A/D converter 120 and the LED on/off switching signal from the LED driver 83. In addition, the infrared/visible separator 130 separates the first data Br into the first infrared data IR11(B) and the first visible data VIS1(B), the second data Gr into the second infrared data IR2(G) and the second visible data VIS2(G), and the third data Rr into the third infrared data IR3(R) and the third visible data VIS3(R), based on the input LED on/off switching signal.

Figure 25:
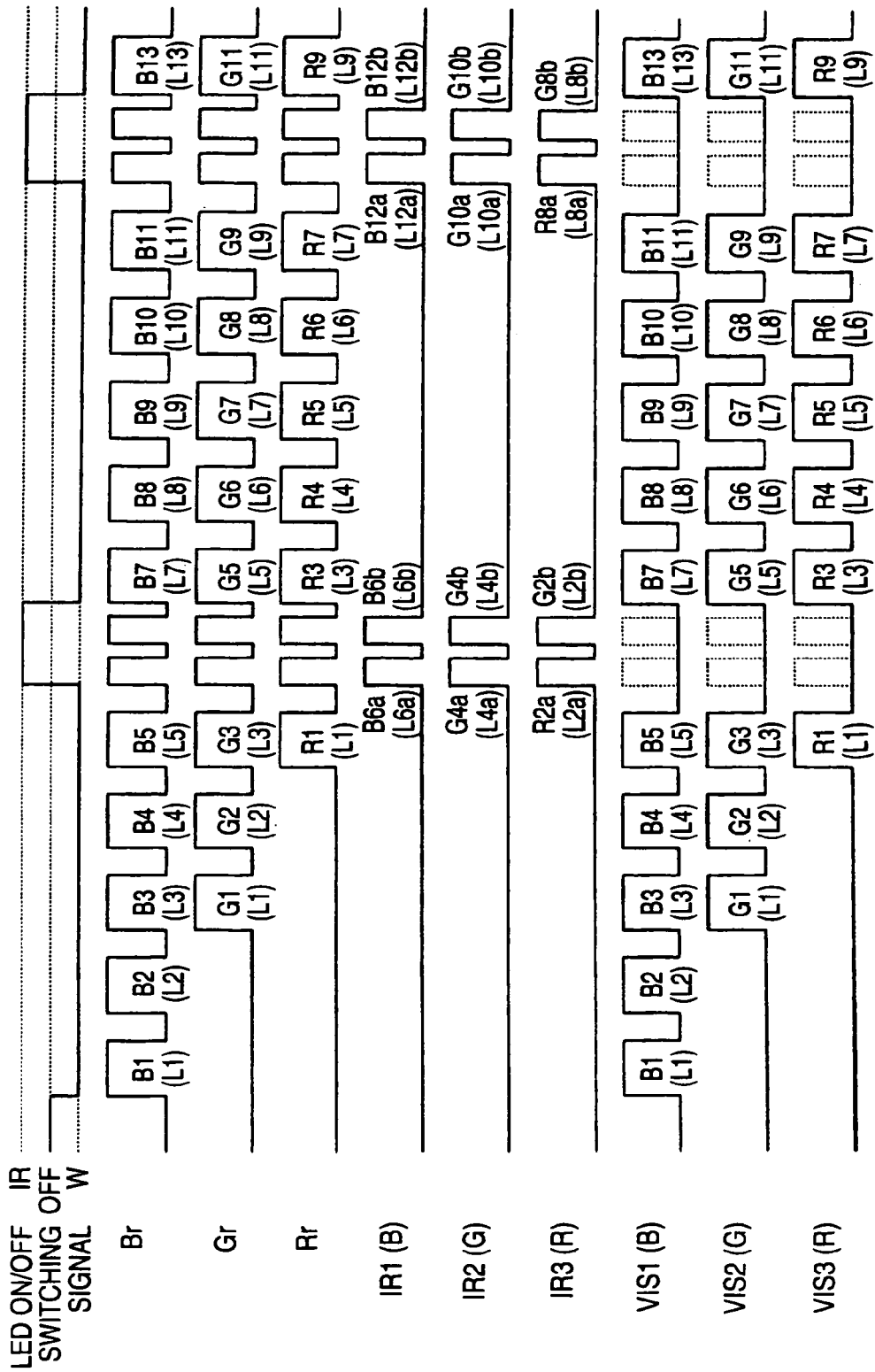
FIG. 25 is a timing chart for describing operations of an infrared/visible separator in a first reading mode.

In the example shown in FIG. 25, from the first data Br, the data B1 to B13 excluding B6a, B6b, B12a, and B12b are output as the first visible data VIS1(B), and the data B6a, B6b, B12a, and B12b are output as the first infrared data IR1(B). In addition, from the second data Gr, the data G1 to G11 excluding G4a, G4b, G10a, and G10b are output as the second visible data VIS2(G), and the data G4a, G4b, G10a, and G10b are output as the second infrared data IR2(G). Furthermore, from the third data Rr, the data R1 to R9 excluding R2a, R2b, R8a, and R8b are output as the third visible data VIS3(R), and the data R2a, R2b, R8a, and R8b are output as the third infrared data IR3(R), respectively. These first, second, and third infrared data IR1(B), IR2(G), and IR3(R) are output to the infrared post-processing portion 200. On the other hand, the first, second, and third visible data VIS1(B), VIS2(G), and VIS3(R) are output to the visible post-processing portion 300. Subsequently, similar to the first exemplary embodiment, the blue, green, and red color data B, G, and R are output after the data supplementing process is performed.

Now, operations of the rearranging portion 240 of the infrared post-processing portion 200 in the first reading mode will be described with reference to the timing chart illustrated in FIG. 26.

The rearranging portion 240 receives the first, second, and third infrared data IR1(B), IR2(G), and IR3(R) that have been shading-corrected in an infrared range by the infrared shading correction portion 230. As shown in FIG. 26, for the first, second, and third infrared data IR1(B6a), IR2(G4a), and IR3(R2a) that are simultaneously acquired, the third infrared data IR3(R2a) is obtained by reading the upstream side L2a of the second read line L2, the second infrared data IR2(G4a) is obtained by reading the upstream side L4a of the fourth read line L4, and the first infrared data IR1(B6a) is obtained by reading the upstream side L6a of the sixth read line L6, respectively. In addition, for the first, second, and third infrared data IR11(B6b), IR2(G4b), and IR3(R2b) that are simultaneously obtained at the next time, the third infrared data IR3(R2b) is obtained by reading the downstream side L2b of the second read line L2, the second infrared data R2(G4b) is obtained by reading the downstream side L4b of the fourth read line L4, and the first infrared data IR1(B6b) is obtained by reading the downstream side L6b of the sixth read line L6, respectively.

Furthermore, for the first, second, and third infrared data IR1(B12a), IR2(G10a), and IR3(R8a) that are simultaneously obtained at the next time, the third infrared data IR3(R8a) is obtained by reading the upstream side of the eighth read line L8, the second infrared data IR2(G10a) is obtained by reading the upstream side of the tenth read line L10, and the first infrared data IR1(Bl2a) is obtained by reading the upstream side of the twelfth read line L12, respectively. Then, for the first, second, and third infrared data IR1(B12b), IR2(G10b), and IR3(R8b) that are simultaneously obtained at the next time, the third infrared data IR3(R8b) is obtained by reading the downstream side of the eighth read line L8, the second infrared data IR2(G10b) is obtained by reading the downstream side of the tenth read line L10, and the first infrared data IR1(B12b) is obtained by reading the downstream side of the twelfth read line L12, respectively.

That is, according to the second exemplary embodiment, it is recognized that the first, second, and third infrared data IR1(B), IR2(G), and IR3(R) correspond to the output data read by dividing each of the even-numbered read lines L2, L4, L6, L8, L10, L12, . . . on the original into 2 lines in a vertical scanning direction.

The rearranging portion 240 receives and temporarily buffers the first, second, and third infrared data IR1(B), IR2(G), and IR3(R). In addition, the rearranging portion 240 rearranges the third, second, and first infrared data IR3(R), IR2(G), and IR1(B) in this order and outputs them as the infrared data IR. As a result, for the infrared data IR, the data are output in the order of L2a, L2b, L4a, L4b, L6a, L6b, L8a, L8b, L10a, L10b, L12a, L12b . . . obtained by dividing each of the even-numbered read lines into 2 lines in a vertical scanning direction. The infrared data IR is output to the identification information analyzing portion 250, and the identification information is analyzed using the process similar to the first exemplary embodiment.

As described above, according to the second exemplary embodiment, the second line period TL2 when the infrared LED is turned on (i.e., when the first, second, and third infrared data IR1(B), IR2(G), and IR3(R) are acquired) is set to a half of the first line period TL1 when the white LED 92 is turned on (i.e., when the first, second, and third visible data VIS1(B), VIS2(G), and VIS3(R) are acquired). As a result, it is possible to obtain the infrared data IR by dividing each of the even-numbered read lines into 2 lines. Therefore, it is possible to match the vertical scanning resolution Res(IR) of the infrared data IR with the vertical scanning resolution Res(VIS) of the visible data in appearance.

The foregoing description of the exemplary embodiments of the present invention has been provided for the purposes of illustration and description. It is not intended to be exhaustive or to limit the invention to the precise forms disclosed. Obviously, many modifications and variations will be apparent to practitioners skilled in the art. The embodiments were chosen and described in order to best explain the principles of the invention and its practical applications, thereby enabling others skilled in the art to understand the invention for various embodiments and with the various modifications as are suited to the particular use contemplated. It is intended that the scope of the invention be defined by the following claims and their equivalents.

What is claimed is:

1. An image reading apparatus comprising:
   a light source having a first luminescent portion that outputs a light with a first wavelength range and a second luminescent portion that outputs a light with a second wavelength range, the first wavelength range being different from the second wavelength range;
   a light-receiving portion that receives a reflection light reflected from an original irradiated by the light source;
   a scanning portion that shifts a reading position of the original read by the light-receiving portion in a vertical scanning direction, by changing a relative position between the original and the light-receiving portion;
   a switching portion that alternately turns on the first and second luminescent portions when the scanning portion shifts the reading position;
   a separation portion that separates data received by the light-receiving portion into a first data obtained when the first luminescent portion is turned on and a second data obtained when the second luminescent portion is turned on;
   an image information acquisition portion that acquires an image information based on the first data separated by the separation portion; and
   an identification information acquisition portion that acquires an identification information based on the second data separated by the separation portion.

2. The image reading apparatus of claim 1, wherein the first luminescent portion outputs a white light as the light with the first wavelength range, and the second luminescent portion outputs an infrared wavelength range light as the light with the second wavelength range.

3. The image reading apparatus of claim 1, wherein the switching portion turns on only the first luminescent portion after the identification information acquisition portion acquires the identification information.

4. The image reading apparatus of claim 1, wherein the image information acquisition portion supplements a data omitted in the first data that results from when the image information is acquired when the second luminescent portion is turned on.

5. The image reading apparatus of claim 4, wherein the image information acquisition portion stops supplementing the data omitted after the identification information acquisition portion acquires the identification information.

6. The image reading apparatus of claim 1, wherein the image information acquisition portion comprises a first shading correction portion that corrects a luminescent characteristic of the first luminescent portion and that corrects a light-receiving characteristic of the light-receiving portion, and
   the identification information acquisition portion comprises a second shading correction portion that corrects a luminescent characteristic of the second luminescent portion and that corrects a light-receiving characteristic of the light-receiving portion.

7. The image reading apparatus of claim 1, wherein the light-receiving portion comprises a plurality of pixel lines that extend along a horizontal scanning direction that are arranged in order along a vertical scanning direction that is orthogonal to the horizontal scanning direction,
   the separation portion separates a plurality of data received by the plurality of pixel lines into a plurality of first data and a plurality of second data,
   the image information acquisition portion acquires an image information by processing each data of the plurality of first data, and
   the identification information acquisition portion acquires an identification information by processing a third data obtained by arranging a plurality of second data.

* * * * *